US011560785B2

(12) United States Patent
Emanuel et al.

(10) Patent No.: US 11,560,785 B2
(45) Date of Patent: Jan. 24, 2023

(54) DETERMINING SPACING BETWEEN WELLBORES

(71) Applicant: Enverus, Inc., Austin, TX (US)

(72) Inventors: Mark Jeffrey Emanuel, Highland Ranch, CO (US); Brendan Nealon, Austin, TX (US); Tyler Krolczyk, Austin, TX (US); Sean W. Moore, Houston, TX (US)

(73) Assignee: Enverus, Inc., Austin, TX (US)

( * ) Notice: Subject to any disclaimer, the term of this patent is extended or adjusted under 35 U.S.C. 154(b) by 213 days.

(21) Appl. No.: 16/775,053

(22) Filed: Jan. 28, 2020

(65) Prior Publication Data

US 2021/0230997 A1    Jul. 29, 2021

(51) Int. Cl.
*E21B 47/022*    (2012.01)
*G01V 99/00*    (2009.01)
*G01V 3/18*    (2006.01)

(52) U.S. Cl.
CPC .............. *E21B 47/022* (2013.01); *G01V 3/18* (2013.01); *G01V 99/005* (2013.01)

(58) Field of Classification Search
CPC ........ E21B 47/022; E21B 47/00; E21B 44/00; E21B 47/08; E21B 7/04; E21B 47/024; G01V 3/18; G01V 99/005; G01V 3/38; G06F 17/00
USPC ................. 175/40, 45; 166/250.01; 324/338; 367/25; 702/1, 6, 9, 127, 150, 166, 179, 702/181; 703/1–2, 10
See application file for complete search history.

(56) References Cited

U.S. PATENT DOCUMENTS

| | | | |
|---|---|---|---|
| 2010/0036614 A1* | 2/2010 | Zuercher | G01V 1/288 703/10 |
| 2010/0286971 A1* | 11/2010 | Middya | E21B 49/00 703/10 |
| 2012/0215628 A1* | 8/2012 | Williams | G06F 30/20 707/E17.069 |
| 2014/0374159 A1 | 12/2014 | McElhinney et al. | |
| 2015/0134255 A1* | 5/2015 | Zhang | G01V 99/005 702/14 |
| 2016/0047224 A1 | 2/2016 | Wilson et al. | |

(Continued)

FOREIGN PATENT DOCUMENTS

| | | | | |
|---|---|---|---|---|
| GB | 2430219 A | * | 3/2007 | ............. E21B 36/00 |
| WO | WO 2009075777 | | 6/2009 | |
| WO | WO 2014142796 | | 9/2014 | |

OTHER PUBLICATIONS

PCT International Search Report and Written Opinion in International Appln. No PCT/US2021/015258, dated May 7, 2021, 9 pages.

(Continued)

*Primary Examiner* — Jeffrey P Aiello
(74) *Attorney, Agent, or Firm* — Fish & Richardson P.C.

(57) ABSTRACT

Techniques for determining a spacing, such as one or more distances, between two or more wellbores formed from a terranean surface to a subterranean formation are described. In some aspects, a wellbore segment is determined for both a first and a second wellbore. One or more distances between the wellbore segments on the first and second wellbores, respectively, is determined. From the determined distance between the wellbore segments on the first and second wellbores, one or more distances between the first and second wellbores may be determined.

32 Claims, 12 Drawing Sheets

(56) References Cited

U.S. PATENT DOCUMENTS

| | | | | |
|---|---|---|---|---|
| 2016/0187534 A1* | 6/2016 | Dogru | ............... | G01V 99/005 |
| | | | | 703/2 |
| 2016/0201450 A1* | 7/2016 | Donderici | ........... | E21B 47/0224 |
| | | | | 367/118 |
| 2016/0247316 A1* | 8/2016 | Whalley | ............... | E21B 47/002 |
| 2019/0120043 A1* | 4/2019 | Gupta | ................. | E21B 47/047 |
| 2020/0011157 A1* | 1/2020 | Hoeink | ................ | E21B 47/022 |
| 2021/0047914 A1* | 2/2021 | Zhernakov | ........... | G01V 99/005 |
| 2021/0109252 A1* | 4/2021 | Li | ............................ | G06N 5/04 |
| 2021/0355771 A1* | 11/2021 | Lu | ........................... | E21B 44/00 |

OTHER PUBLICATIONS

Drillinginfo, "DI Well Spacing V1.0—Diagnostics," Upstream, Jul. 2019, 16 pages.
Enverus, "Well Spacing," Jul. 2019, 10 pages.

* cited by examiner

| PARENT WELLBORE:<br>CHILD WELLBORE#1: | WELLBORE NAME<br>WELLBORE NAME | | VERTICAL<br>DISTANCE | HORIZONTAL<br>DISTANCE | TRUE<br>DISTANCE |
|---|---|---|---|---|---|
| | | MINIMUM | 301 ft. | 101 ft. | 317 ft. |
| | | MAXIMUM | 385 ft. | 125 ft. | 404 ft. |
| | | MEAN | 344 ft. | 112 ft. | 362 ft. |

| PARENT WELLBORE:<br>CHILD WELLBORE#2: | WELLBORE NAME<br>WELLBORE NAME | | VERTICAL<br>DISTANCE | HORIZONTAL<br>DISTANCE | TRUE<br>DISTANCE |
|---|---|---|---|---|---|
| | | MINIMUM | 101 ft. | 56 | 115 ft. |
| | | MAXIMUM | 113 ft. | 76 ft. | 136 ft. |
| | | MEAN | 110 ft. | 68 ft. | 139 ft. |

| PARENT WELLBORE:<br>CHILD WELLBORE#3: | WELLBORE NAME<br>WELLBORE NAME | | VERTICAL<br>DISTANCE | HORIZONTAL<br>DISTANCE | TRUE<br>DISTANCE |
|---|---|---|---|---|---|
| | | MINIMUM | 8 ft. | 135 ft. | 135 ft. |
| | | MAXIMUM | 22 ft. | 155 ft. | 157 ft. |
| | | MEAN | 12 ft. | 143 ft. | 144 ft. |

FIG. 6A

DETERMINING SPACING BETWEEN WELLBORES

TECHNICAL FIELD

This document relates to systems and methods for determining spacing between wells formed into a subterranean formation.

BACKGROUND

Wellbores are formed from the Earth's surface into one or more subterranean zones that are comprised of hydrocarbon-bearing rock formations. Often, multiple wellbores may be formed into the same rock formation or an adjacent rock formation. In some cases, the wellbores are formed too closely together, thereby failing to maximize a hydrocarbon-draining volume of the wellbores relative to their drilling and completion costs. In some cases, the wellbores are formed too far apart, thereby failing to adequately drain the hydrocarbons from the rock formation(s).

SUMMARY

In an example implementation, a computer-implemented method for determining wellbore spacing includes identifying, with one or more hardware processors, a first wellbore formed from a terranean surface into a subterranean formation of a plurality of wellbores formed from the terranean surface toward the subterranean formation; determining, with the one or more hardware processors, at least one second wellbore formed from the terranean surface toward the subterranean formation of the plurality of wellbores based on one or more wellbore search criteria; determining, with the one or more hardware processors, at least two locations on the first wellbore that define a wellbore segment of the first wellbore; determining, with the one or more hardware processors, at least two locations on the at least one second wellbore that define a wellbore segment of the at least one second wellbore; determining, with the one or more hardware processors, at least one distance between the wellbore segment of the first wellbore and the wellbore segment of the at least one second wellbore; determining, with the one or more hardware processors, at least one distance between the first wellbore and the at least one second wellbore based on the determined at least one distance between the wellbore segment of the first wellbore and the wellbore segment of the at least one second wellbore; and generating, with the one or more hardware processors, a graphical representation of the determined at least one distance between the first wellbore and the at least one second wellbore.

In an aspect combinable with the example implementation, the at least one distance between the first wellbore and the at least one second wellbore includes at least one of a minimum distance between the first wellbore and the at least one second wellbore; a maximum distance between the first wellbore and the at least one second wellbore; or a mean distance between the first wellbore and the at least one second wellbore.

In an aspect combinable with any of the previous aspects, the at least two locations on the first wellbore include a plurality of locations on a horizontal portion of the first wellbore defined between a toe of the first wellbore and a heel of the first wellbore.

In an aspect combinable with any of the previous aspects, the at least two locations on the at least one second wellbore include a plurality of locations on a horizontal portion of the at least one second wellbore defined between a toe of the at least one second wellbore and a heel of the at least one second wellbore.

An aspect combinable with any of the previous aspects further includes determining, with the one or more hardware processors, a plurality of wellbore segments of the first wellbore, each of the plurality of wellbore segments defined between a pair of adjacent locations of the plurality of locations on the horizontal portion of the first wellbore; determining, with the one or more hardware processors, a plurality of wellbore segments of the at least one second wellbore, each of the plurality of wellbore segments defined between a pair of adjacent locations of the plurality of locations on the horizontal portion of the at least one second wellbore; and determining, with the one or more hardware processors, at least one distance between each of the plurality of wellbore segments of the first wellbore and the plurality of wellbore segments of the at least one second wellbore.

An aspect combinable with any of the previous aspects further includes determining, with the one or more hardware processors, the at least one distance between the first wellbore and the at least one second wellbore based on the determined at least one distance between each of the plurality of wellbore segments of the first wellbore and the plurality of wellbore segments of the at least one second wellbore.

In an aspect combinable with any of the previous aspects, determining the at least one distance between each of the plurality of wellbore segments of the first wellbore and the plurality of wellbore segments of the at least one second wellbore includes determining a minimum distance between each of the plurality of wellbore segments of the first wellbore and the plurality of wellbore segments of the at least one second wellbore; determining a maximum distance between each of the plurality of wellbore segments of the first wellbore and the plurality of wellbore segments of the at least one second wellbore; and determining a mean distance between each of the plurality of wellbore segments of the first wellbore and the plurality of wellbore segments of the at least one second wellbore.

An aspect combinable with any of the previous aspects further includes determining the plurality of locations on the horizontal portion of the first wellbore based at least in part on a directional survey of the first wellbore.

In an aspect combinable with any of the previous aspects, determining the at least two locations on the first wellbore that define the wellbore segment of the first wellbore includes determining, with the one or more hardware processors, a first location that corresponds to a heel of the first wellbore; determining, with the one or more hardware processors, a second location that corresponds to a toe of the first wellbore; and determining, with the one or more hardware processors, the wellbore segment of the first wellbore that includes a direct line between the first and second locations.

In an aspect combinable with any of the previous aspects, the at least one distance between the wellbore segment of the first wellbore and the wellbore segment of the at least one second wellbore includes at least one orthogonal distance between the wellbore segment of the first wellbore and the wellbore segment of the at least one second wellbore.

In an aspect combinable with any of the previous aspects, the one or more wellbore search criteria includes a distance from the first wellbore.

In an aspect combinable with any of the previous aspects, determining the at least one second wellbore formed from the terranean surface toward the subterranean formation of the plurality of wellbores based on one or more wellbore search criteria includes determining, with the one or more hardware processors, a surface trajectory of the first wellbore between a first surface location that corresponds to an entry point of the first wellbore and a second surface location that corresponds to a surface point above a bottom hole location of the first wellbore; and determining, with the one or more hardware processors, the at least one second wellbore of the plurality of wellbores that passes within a volume defined by the distance from the surface trajectory of the first wellbore.

An aspect combinable with any of the previous aspects further includes determining, with the one or more hardware processors, the at least one second wellbore of the plurality of wellbores that includes a horizontal portion that has at least a defined percentage within the volume defined by the distance from the surface trajectory of the first wellbore.

In an aspect combinable with any of the previous aspects, the one or more wellbore search criteria further includes a reference date of the first wellbore.

In an aspect combinable with any of the previous aspects, determining the at least one second wellbore formed from the terranean surface toward the subterranean formation of the plurality of wellbores based on one or more wellbore search criteria further includes determining, with the one or more hardware processors, the at least one second wellbore of the plurality of wellbores that includes an online date within at least one of a first time duration prior to the reference date of the first wellbore or a second time duration subsequent to the reference date of the first wellbore.

An aspect combinable with any of the previous aspects further includes generating, with the one or more hardware processors, a graphical map representation of the first wellbore and the determined at least one second wellbore.

In an aspect combinable with any of the previous aspects, the reference date of the first wellbore includes at least one of a completion date of the first wellbore, a first production date of the first wellbore, or a last production date of the first wellbore.

An aspect combinable with any of the previous aspects further includes determining, with the one or more hardware processors, that a particular one of the plurality of wellbores passes wholly outside of the volume defined by the distance from the surface trajectory of the first wellbore; or determining, with the one or more hardware processors, that the particular one of the plurality of wellbores includes an online date outside of the first time duration prior to the reference date of the first wellbore and outside of the second time duration subsequent to the reference date of the first wellbore.

An aspect combinable with any of the previous aspects further includes setting, with the one or more hardware processors, a flag on the particular one of the plurality of wellbores.

In an aspect combinable with any of the previous aspects, determining the at least one distance between the first wellbore and the at least one second wellbore based on the determined at least one distance between the wellbore segment of the first wellbore and the wellbore segment of the at least one second wellbore includes determining, with the one or more hardware processors, at least one vertical distance between the first wellbore and the at least one second wellbore; determining, with the one or more hardware processors, at least one horizontal distance between the first wellbore and the at least one second wellbore; and determining, with the one or more hardware processors, at least one true distance between the first wellbore and the at least one second wellbore.

In another example implementation, a computing system for determining wellbore spacing includes one or more hardware processors; and at least one memory in communication with the one or more hardware processors. The memory stores instructions operable when executed by the one or more hardware processors to cause the one or more hardware processors to perform operations including identifying a first wellbore formed from a terranean surface into a subterranean formation of a plurality of wellbores formed from the terranean surface toward the subterranean formation; determining at least one second wellbore formed from the terranean surface toward the subterranean formation of the plurality of wellbores based on one or more wellbore search criteria; determining at least two locations on the first wellbore that define a wellbore segment of the first wellbore; determining at least two locations on the at least one second wellbore that define a wellbore segment of the at least one second wellbore; determining at least one distance between the wellbore segment of the first wellbore and the wellbore segment of the at least one second wellbore; determining at least one distance between the first wellbore and the at least one second wellbore based on the determined at least one distance between the wellbore segment of the first wellbore and the wellbore segment of the at least one second wellbore; and generating a graphical representation of the determined at least one distance between the first wellbore and the at least one second wellbore.

In an aspect combinable with the example implementation, the at least one distance between the first wellbore and the at least one second wellbore includes at least one of a minimum distance between the first wellbore and the at least one second wellbore; a maximum distance between the first wellbore and the at least one second wellbore; or a mean distance between the first wellbore and the at least one second wellbore.

In an aspect combinable with any of the previous aspects, the at least two locations on the first wellbore include a plurality of locations on a horizontal portion of the first wellbore defined between a toe of the first wellbore and a heel of the first wellbore.

In an aspect combinable with any of the previous aspects, the at least two locations on the at least one second wellbore include a plurality of locations on a horizontal portion of the at least one second wellbore defined between a toe of the at least one second wellbore and a heel of the at least one second wellbore.

In an aspect combinable with any of the previous aspects, the operations further include determining a plurality of wellbore segments of the first wellbore, each of the plurality of wellbore segments defined between a pair of adjacent locations of the plurality of locations on the horizontal portion of the first wellbore; determining a plurality of wellbore segments of the at least one second wellbore, each of the plurality of wellbore segments defined between a pair of adjacent locations of the plurality of locations on the horizontal portion of the at least one second wellbore; and determining at least one distance between each of the plurality of wellbore segments of the first wellbore and the plurality of wellbore segments of the at least one second wellbore.

In an aspect combinable with any of the previous aspects, the operations further include determining the at least one distance between the first wellbore and the at least one second wellbore based on the determined at least one distance between each of the plurality of wellbore segments of the first wellbore and the plurality of wellbore segments of the at least one second wellbore.

In an aspect combinable with any of the previous aspects, the operation of determining the at least one distance between each of the plurality of wellbore segments of the first wellbore and the plurality of wellbore segments of the at least one second wellbore includes determining a minimum distance between each of the plurality of wellbore segments of the first wellbore and the plurality of wellbore segments of the at least one second wellbore; determining a maximum distance between each of the plurality of wellbore segments of the first wellbore and the plurality of wellbore segments of the at least one second wellbore; and determining a mean distance between each of the plurality of wellbore segments of the first wellbore and the plurality of wellbore segments of the at least one second wellbore.

In an aspect combinable with any of the previous aspects, the operations further include determining the plurality of locations on the horizontal portion of the first wellbore based at least in part on a directional survey of the first wellbore.

In an aspect combinable with any of the previous aspects, the operation of determining at least two locations on the first wellbore that define the wellbore segment of the first wellbore includes determining a first location that corresponds to a heel of the first wellbore; determining a second location that corresponds to a toe of the first wellbore; and determining the wellbore segment of the first wellbore that includes a direct line between the first and second locations.

In an aspect combinable with any of the previous aspects, the at least one distance between the wellbore segment of the first wellbore and the wellbore segment of the at least one second wellbore includes at least one orthogonal distance between the wellbore segment of the first wellbore and the wellbore segment of the at least one second wellbore.

In an aspect combinable with any of the previous aspects, the one or more wellbore search criteria includes a distance from the first wellbore.

In an aspect combinable with any of the previous aspects, the operation of determining the at least one second wellbore formed from the terranean surface toward the subterranean formation of the plurality of wellbores based on one or more wellbore search criteria includes determining a surface trajectory of the first wellbore between a first surface location that corresponds to an entry point of the first wellbore and a second surface location that corresponds to a surface point above a bottom hole location of the first wellbore; and determining the at least one second wellbore of the plurality of wellbores that passes within a volume defined by the distance from the surface trajectory of the first wellbore.

In an aspect combinable with any of the previous aspects, the operations further include determining the at least one second wellbore of the plurality of wellbores that includes a horizontal portion that has at least a defined percentage within the volume defined by the distance from the surface trajectory of the first wellbore.

In an aspect combinable with any of the previous aspects, the one or more wellbore search criteria further includes a reference date of the first wellbore.

In an aspect combinable with any of the previous aspects, the operation of determining the at least one second wellbore formed from the terranean surface toward the subterranean formation of the plurality of wellbores based on one or more wellbore search criteria further includes determining the at least one second wellbore of the plurality of wellbores that includes an online date within at least one of a first time duration prior to the reference date of the first wellbore or a second time duration subsequent to the reference date of the first wellbore.

In an aspect combinable with any of the previous aspects, the operations further include generating a graphical map representation of the first wellbore and the determined at least one second wellbore.

In an aspect combinable with any of the previous aspects, the reference date of the first wellbore includes at least one of a completion date of the first wellbore, a first production date of the first wellbore, or a last production date of the first wellbore.

In an aspect combinable with any of the previous aspects, the operations further include determining that a particular one of the plurality of wellbores passes wholly outside of the volume defined by the distance from the surface trajectory of the first wellbore; or determining that the particular one of the plurality of wellbores includes an online date outside of the first time duration prior to the reference date of the first wellbore and outside of the second time duration subsequent to the reference date of the first wellbore.

In an aspect combinable with any of the previous aspects, the operations further include setting a flag on the particular one of the plurality of wellbores.

In an aspect combinable with any of the previous aspects, the operation of determining the at least one distance between the first wellbore and the at least one second wellbore based on the determined at least one distance between the wellbore segment of the first wellbore and the wellbore segment of the at least one second wellbore includes determining at least one vertical distance between the first wellbore and the at least one second wellbore; determining at least one horizontal distance between the first wellbore and the at least one second wellbore; and determining at least one true distance between the first wellbore and the at least one second wellbore.

One, some, or all of the implementations according to the present disclosure may include one or more of the following features. For example, implementations according to the present disclosure may not require sampling parameters and can be executed without operator intervention to specify such sampling parameters, which may vary between geologic regions or even from well to well making specify optimal parameters a time-consuming, error-prone process. As another example, implementations according to the present disclosure may also consider a full path of the wellbore and calculate minimum, maximum, and average spacing distances more accurately than sampled implementations, which may be too undersampled to detect true maxima and minima. Thus, in some examples, implementations according to the present disclosure may more accurately determining spacing between wellbores, which is critical for understanding oilfield development, optimization, asset valuation, and competitor analysis.

The details of one or more embodiments are set forth in the accompanying drawings and the description below. Other features, objects, and advantages will be apparent from the description and drawings, and from the claims.

DESCRIPTION OF DRAWINGS

FIGS. 6A-6C are example graphical illustrations of output from the example process for determining wellbore spacing according to the present disclosure.

DETAILED DESCRIPTION

This document discusses techniques (e.g., computer-implemented method, computer program product, computer system) for determining a spacing, such as one or more distances, between two or more wellbores (also referred to as "wells") formed from a terranean surface to a subterranean formation. In some aspects, a wellbore segment (e.g., a portion of the wellbore defined between two locations on the wellbore) is determined for both a first and a second wellbore. One or more distances between the wellbore segments on the first and second wellbores, respectively, is determined. From the determined distance between the wellbore segments on the first and second wellbores, one or more distances between the first and second wellbores may be determined.

Figure 1A:
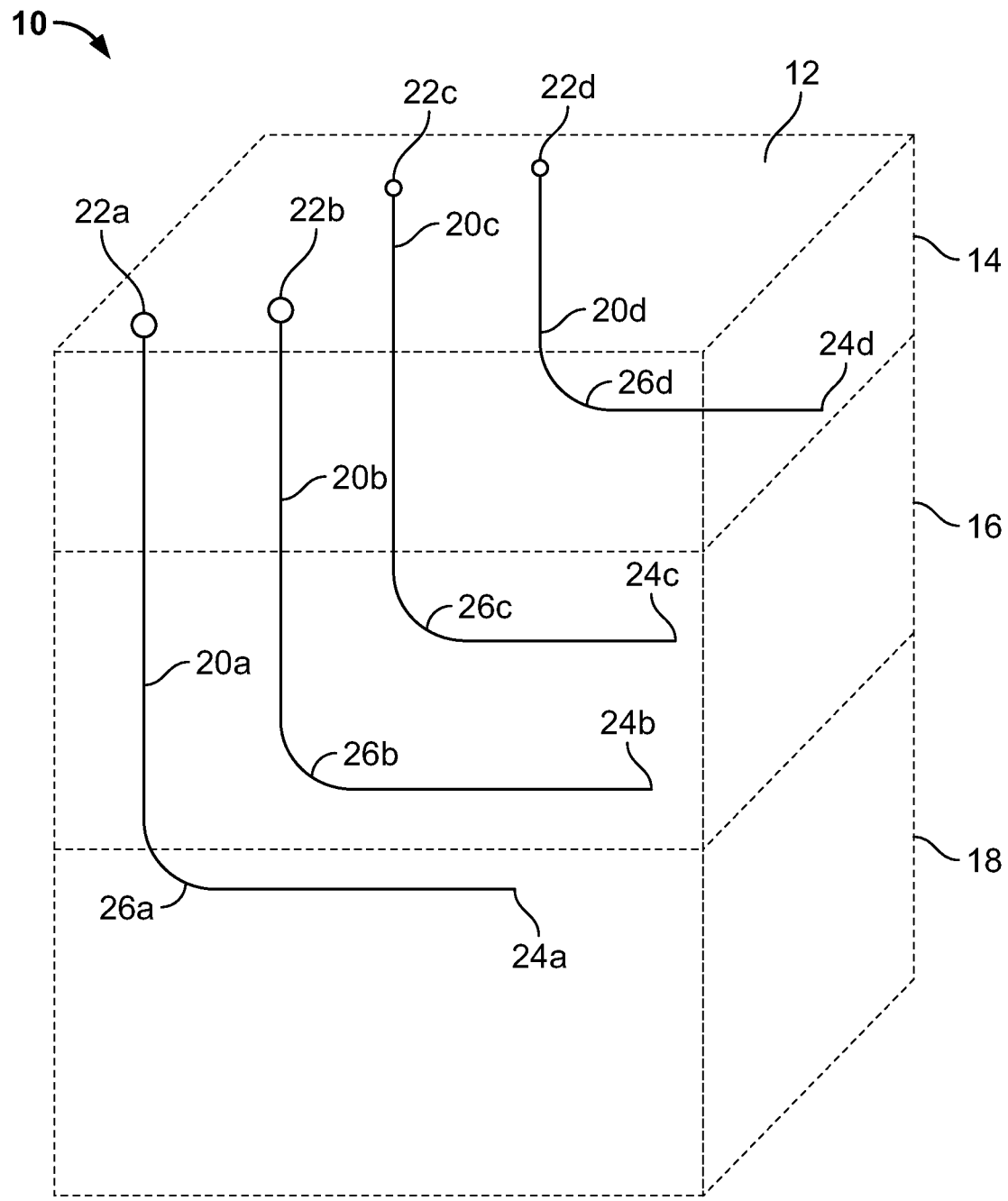
FIG. 1A illustrates a system of wellbores formed from a terranean surface to a subterranean formation according to the present disclosure.

FIG. 1A illustrates a system 10 of wellbores 20a, 20b, 20c, and 20d that is illustrative of an example wellbore system according to the present disclosure. As shown, each of the wellbores 20a-20d are formed from a terranean surface 12 through and into one or more subterranean formations 14, 16, or 18. Each of the wellbores 20a-20d includes, respectively, an entry location 22a-22d, a toe location 24a-24d, and a heel location 26a-26d. Although illustrated as single-lateral horizontal wellbores, one or more of the wellbores 20a-20d may be vertical-only wellbores or directional wellbores with multiple laterals. Further, although shown as having entry points 22a-22d, respectively, on the terranean surface 12, one or more of the wellbores 20a-20d may be subsea wellbores (or otherwise formed under a body of water). Thus, wellbore system 10 is a schematic example illustration of a system of wellbores for which one or more wellbore spacings may be determined according to the present disclosure. Other example wellbore systems, with fewer or more wellbores, fewer or more subterranean formations, and different wellbore designs are also contemplated by the present disclosure.

Figure 1B:
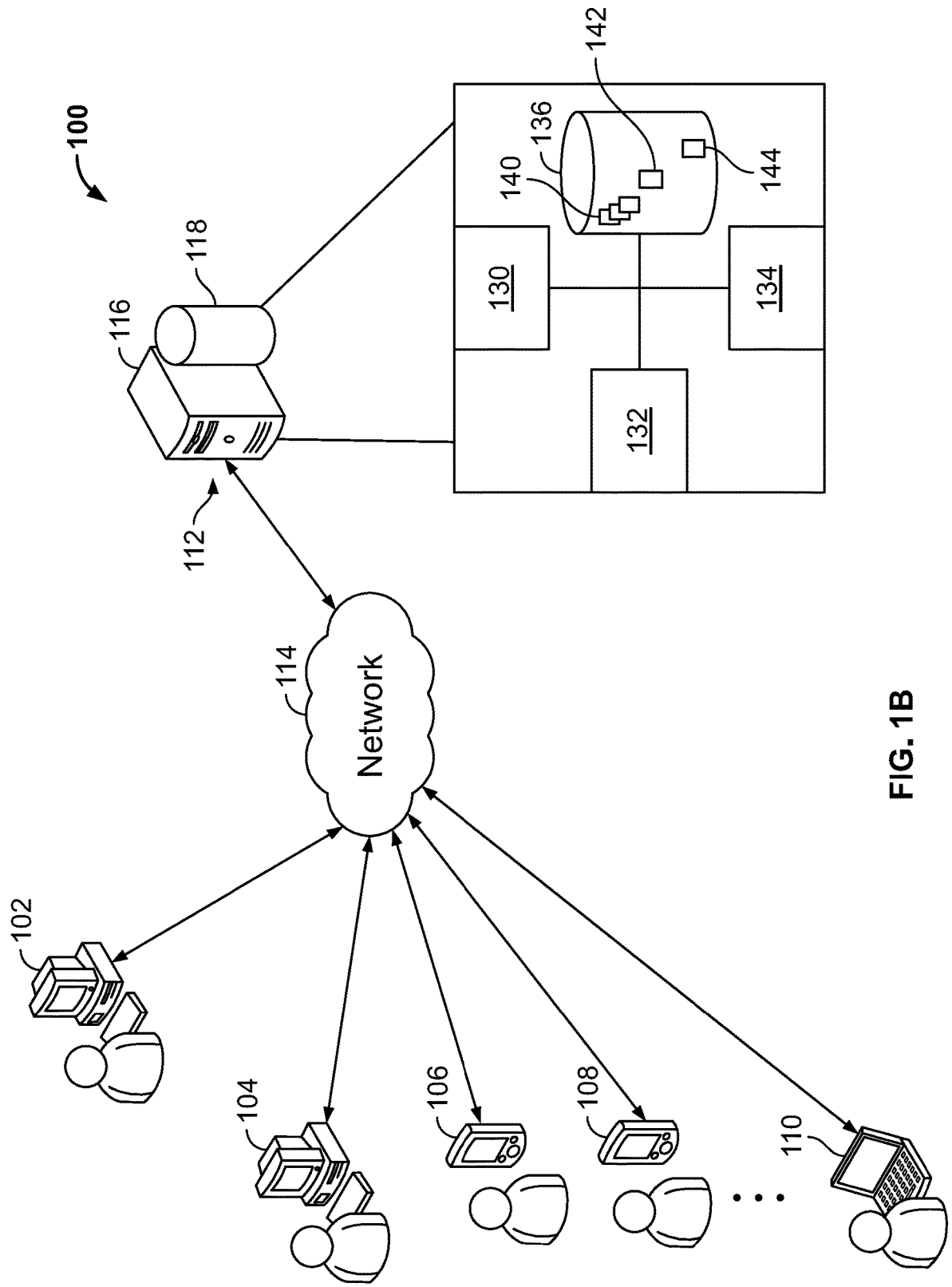
FIG. 1B illustrates an example distributed network architecture that includes one or more client devices and one or more server devices for determining wellbore spacing in a system of wellbores according to the present disclosure.

FIG. 1B illustrates an example distributed network architecture 100 that includes one or more client devices and one or more server devices that is operable to determine one or more wellbore spacings of a wellbore system (e.g., wellbore system 10) according to the present disclosure. The network architecture 100 includes a number of client devices 102, 104, 106, 108, 110 communicably connected to a structured data processing server system 112 ("server system 112") by a network 114. The server system 112 includes a server device 116 and a data store 118. The server device 116 executes computer instructions (e.g., all or a part of a wellbore spacing solver application) stored in the data store 118 to perform functions of a wellbore spacing service. For example, in some aspects, the wellbore spacing service may be a subscription service available to the client devices 102, 104, 106, 108, and 110 (and other client devices) by an owner or operator of the server system 112. In some aspects, the server system 112 may be owned or operated by a third party (e.g., a collocation server system) that hosts the wellbore spacing service for the owner or operator of the wellbore spacing service.

Users of the client devices 102, 104, 106, 108, 110 access the server device 112 to participate in the wellbore spacing service. For example, the client devices 102, 104, 106, 108, 110 can execute web browser applications that can be used to access the wellbore spacing service. In another example, the client devices 102, 104, 106, 108, 110 can execute software applications that are specific to the wellbore spacing service (e.g., as "apps" running on smartphones). In other words, all of the wellbore spacing service may be hosted and executed on the server system 112. Or in alternative aspects, a portion of the wellbore spacing service may execute on the client devices 102, 104, 106, 108, and 110 (e.g., to receive and transmit information entered by a user of such client devices and/or to display output data from the wellbore spacing service to the user).

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

As illustrated in FIG. 1B, the server system 112 (e.g., the server device 116 and data store 118) includes one or more processing devices 132, the wellbore spacing solver 130, one or more memory modules 136, and an interface 134. Generally, each of the components of the server system 112 are communicably coupled such that the one or more processing devices 132 may execute the wellbore spacing solver 132 and access and manipulate data stored in the one or more memory modules 136. Data to be output from the server system 112, or data to be input to the server system 112, may be facilitated with the interface 134 that communicably couples the server system 112 to the network 114.

As illustrated in this example, the one or more memory modules 136 may store or references one or more wellbore files 140. Each of the wellbore files 140 may comprise or be a digital image of data for a particular wellbore (e.g., one of wellbores 20a-20d). Each wellbore file 140, therefore, in some aspects, may be unique to a particular wellbore and may include, for example: one or more directional surveys or logs of the wellbore; geolocation surface data for an entry point, heel location, and toe location; and/or drilling, production, and/or completion data, about said unique wellbore (to the extent such data is available for said wellbore). Thus, for the example wellbore system 10, each wellbore 20a-20d may have a unique wellbore file 140 stored in the one or more memory modules 136

As shown, the one or more memory modules 136 may store other portions of data that are determined or produced during execution of the wellbore spacing solver 130 to, e.g., produce one or more wellbore spacing distances between two or more wellbores within a wellbore system, graphical maps (e.g., plat views or otherwise) of the wellbores for which distances therebetween are determined, or other user specified or user requested data. For example, wellbore spacing distance data 142 may be stored (at least transiently), as well as wellbore map data 144. Other data, either calculated or determined, generated by execution of the wellbore spacing solver 112 (as described herein) may also be stored (even if transiently) in the one or more memory modules 136.

Figure 2A:
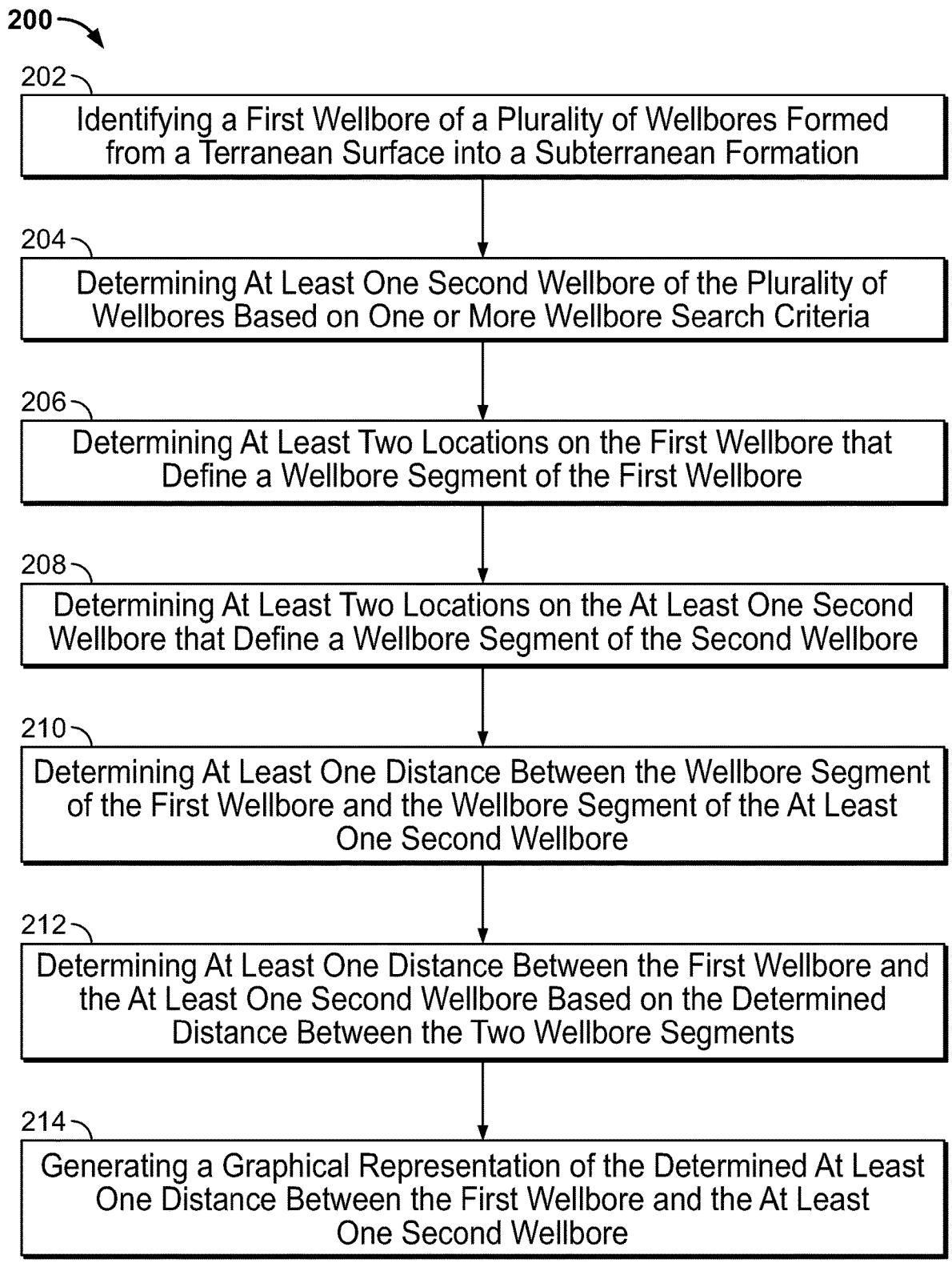
FIG. 2A illustrates an example process for determining wellbore spacing according to the present disclosure.

FIG. 2A illustrates an example process 200 performed with a wellbore spacing solver to determine one or more user-specified data regarding wellbore spacing distances. For example, process 200 can be performed by or with the wellbore spacing solver 130 of the structured data processing server system 112 in the distributed network architecture 100 shown in FIG. 1B.

In the example implementation of FIG. 2A, process 200 may begin at step 202, which includes identifying a first wellbore of a plurality of wellbores formed from a terranean surface into a subterranean formation. For example, the wellbore spacing service may expose (e.g., in a drop down menu or otherwise) one or more wellbore selection criteria to the client devices 102 through 110 for selection. Such criteria may include, for example, an identification (API number, name, or otherwise) of a particular well that has been formed and recorded under regulatory requirements. As another example, the selection criteria may include a name or other identifier of a lease, field, or subterranean formation associated with one or more wells, and the user may select a particular well as the first wellbore As another example, the selection criteria may include production, completion, or other operational dates associated with one or more wells, and the user may select a particular well as the first wellbore. Such selection is received or acknowledged by the wellbore spacing service on the server system 112. In some aspects, the user on a client device may simply enter the selection criteria that identifies the first wellbore rather than selecting from an exposed list of selection criteria, and the identification of the first wellbore is received or acknowledged by the wellbore spacing service on the server system 112.

Figure 2B:
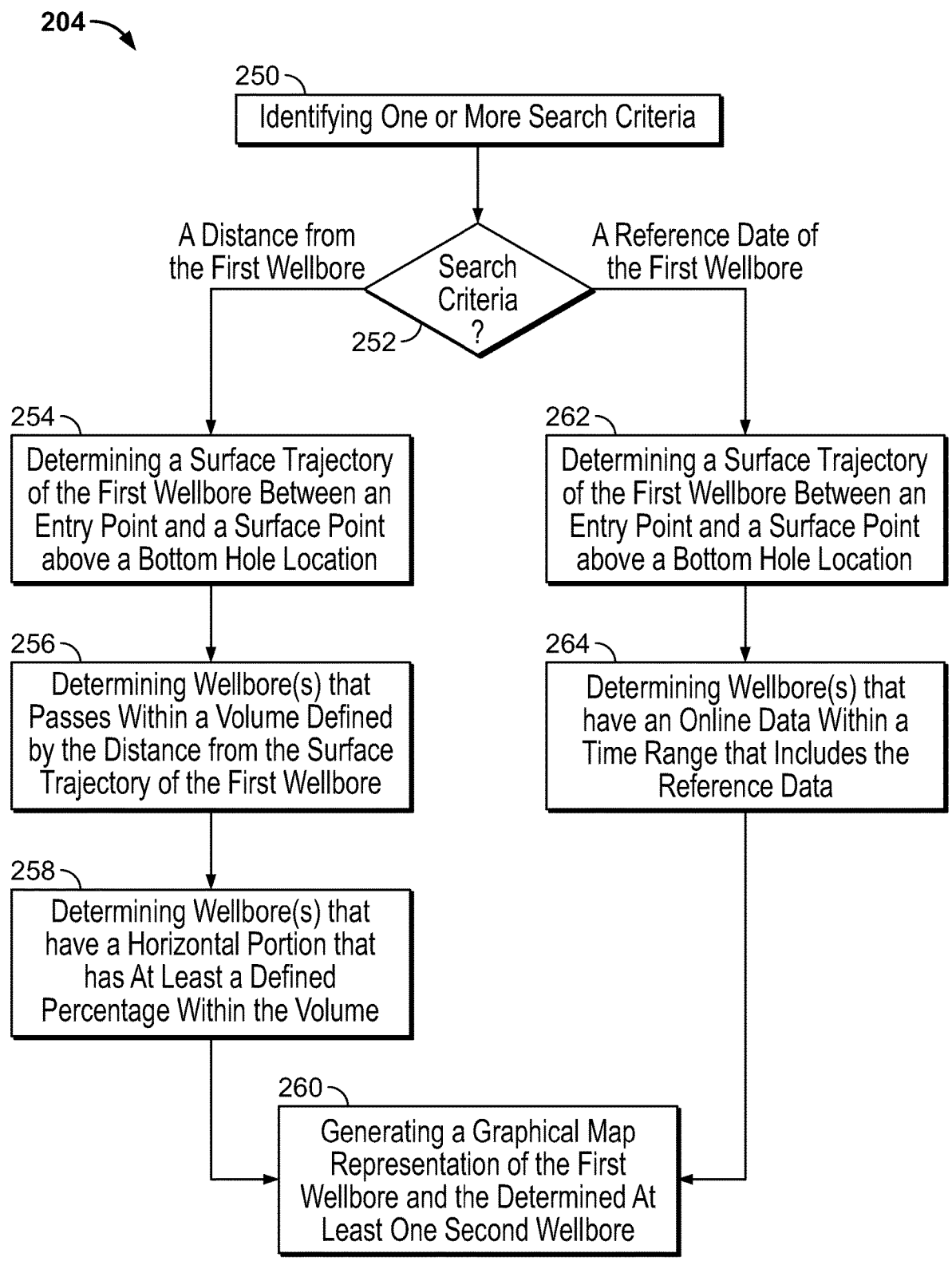
FIG. 2B illustrates an example sub-process that is part of the example process of FIG. 2A.

Process 200 may continue at step 204, which includes determining at least one second wellbore of the plurality of wellbores based on one or more wellbore search criteria. For example, the wellbore spacing service may identify or determine another wellbore (or other wellbores) based on the wellbore search criteria (e.g., entered by a user or predetermined by the wellbore spacing service). The wellbore search criteria may include, for example, geolocation criteria, such as locations of the other wellbores relative to the first wellbore. Thus, in some aspects, one or more second wellbores may be determined or selected based on relative geolocation adjacency with the first wellbore (i.e., such second wellbores are close enough to the first wellbore to be selected). As another example, alternatively or additionally, the wellbore search criteria may include, for example, reference date criteria, such as completion, first production, and/or last production dates of the other wellbores relative to the first wellbore. Thus, in some aspects, one or more second wellbores may be determined or selected based on relative temporal adjacency with the first wellbore (i.e., such second wellbores have been completed and/or produced within a time range sufficiently near enough to the first wellbore to be selected). FIG. 2B, described later, provides an example sub-process for step 204.

Figure 3A:
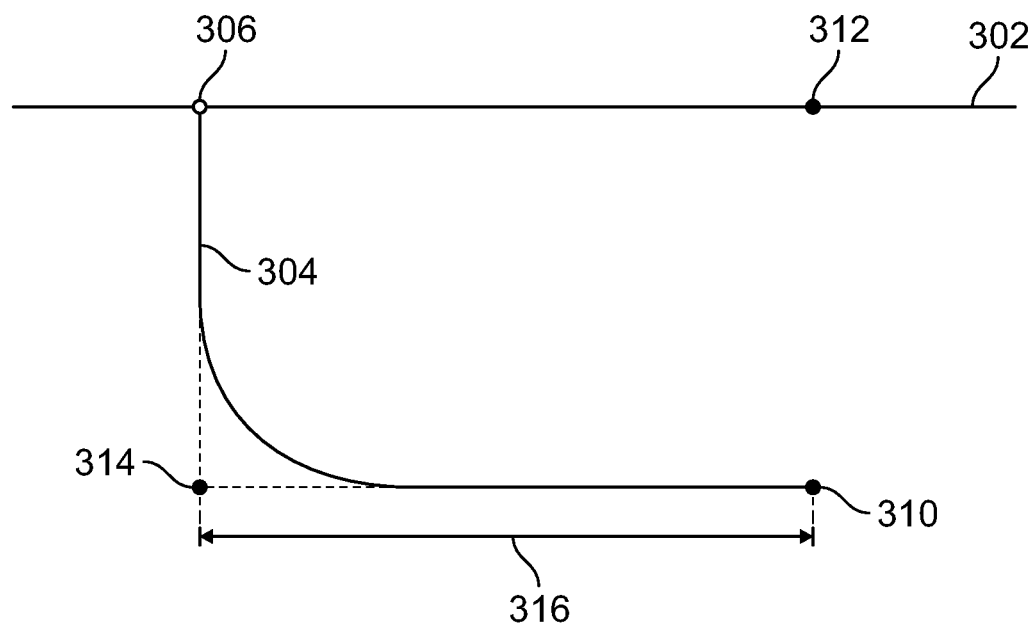
FIGS. 3A-3B are schematic illustrations of wellbore segments of a wellbore according to the present disclosure.

Process 200 may continue at step 206, which includes determining at least two locations on the first wellbore that define a wellbore segment of the first wellbore. For example, in some aspects, the wellbore spacing service determines two locations on the first wellbore to define a wellbore segment. In some aspects, the two locations represent a toe location and a heel location of the first wellbore. Turning to FIG. 3A, for example, this schematic illustration shows an example wellbore 304 (in this example, the first wellbore), with an entry location 306 at a terranean surface 302 and a toe location 310. As shown, a heel location 314 may be determined (e.g., by the wellbore spacing service) that is at an intersection of a vertical projection downward from the entry location 306 and a horizontal projection from the toe location 310 (i.e., the true vertical depth). These projections are represented by dotted lines. Further, a surface projection location 312 that corresponds to the toe location 310 may be determined. A single wellbore segment 316 may then be determined between the heel location 314 and the toe location 310 to represent a horizontal portion of the wellbore 304.

Thus, in some aspects, the wellbore spacing service, in order to determine at least one wellbore segment of the first wellbore, generates a three-point synthetic trajectory. The three points are the head (i.e., entry location), heel, and toe. The head is the surface hole location, while the toe is at the bottom hole location at the wellbore's true vertical depth. In the absence of additional information, the synthetic trajectory may be a simplistic L-shaped trajectory. The synthetic trajectory may start with a vertical segment from the head down to the wellbore's true vertical depth, followed by a horizontal section in a direction of the well stick straight to the toe. In this example, the heel is positioned directly beneath the surface location. However, if well sticks are built for wells on pads, they may radiate from the pad location in a fan-like manner. Calculating spacing from these stick-based synthetic trajectories for wells on a pad yield distances that may be half of the expected spacing distances. Therefore, when multiple wellbores are associated with a pad, a more realistic synthetic trajectory is generated. For example, for each pad, groups of wells with similar azimuths may have trajectory heel positions synthesized such that 1) their horizontal sections are parallel in the direction of the prevailing azimuth for the group, and 2) each wellbore's lateral length is honored. As with the L-shaped synthetic trajectory, the synthetic trajectory heel position for pad wells may also be at the well's true vertical depth. Once the correct head, heel, and toe are determined, the wellbore segment of the wellbore may be determined between the heel and toe.

Figure 3B:
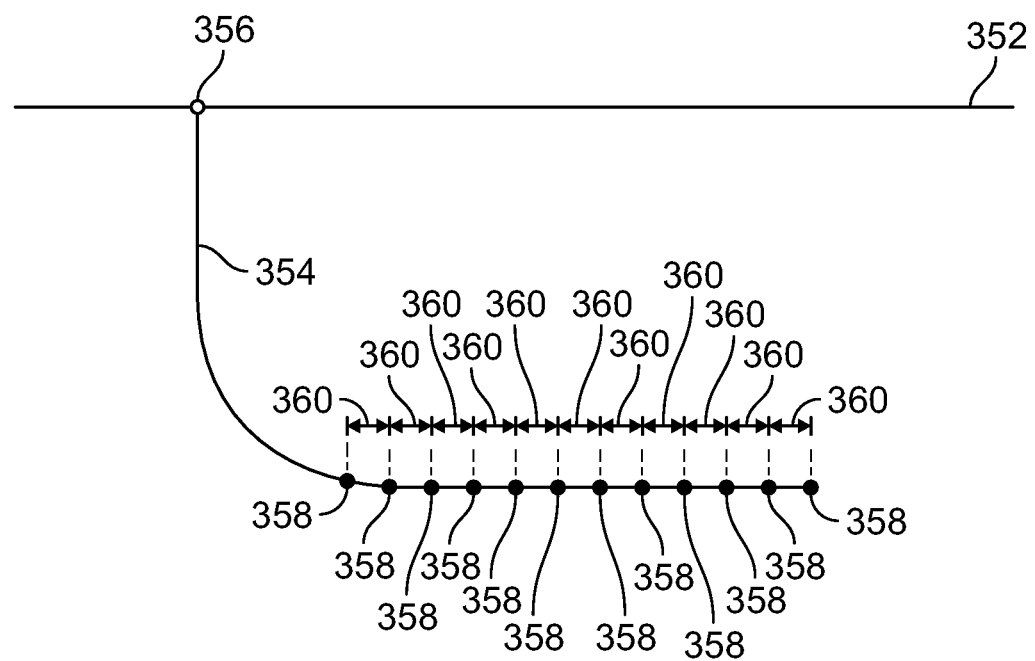

In other aspects, determining at least two locations on the first wellbore that define a wellbore segment of the first wellbore in step 204 includes determining a plurality of wellbore locations on the first wellbore and determining a plurality of wellbore segments, with each wellbore segment being defined between two adjacent wellbore locations of the first wellbore. For example, in some aspects, a directional survey or other record that provides wellbore location data may be available for the first wellbore (such as within the wellbore files 140). The directional survey for the first wellbore, for example, may provide the geolocation data (e.g., in three dimensions) for the plurality of wellbore locations on the first wellbore. For example, turning to FIG. 3B, this schematic illustration shows an example wellbore 354 (in this example, the first wellbore), with an entry location 356 at a terranean surface 352 and a plurality of wellbore locations 358 that are located, e.g., between a heel and a toe of the wellbore 354. As shown, adjacent wellbore locations 358 may define wellbore segments 360 therebetween. Thus, in this example, the wellbore spacing service may determine multiple wellbore segments of the first wellbore.

In some aspects, therefore, the wellbore spacing service may determine the wellbore segments of the first wellbore to estimate or derive a polyline that represents at least the horizontal portion of the first wellbore. Conventionally, a sampling-based distance calculation is used to calculate spacing between wells, but there are inherent biases in sampling points along a directional survey that can lead to errors and artifacts in the distance calculations. Thus, to avoid such errors and provide accurate measurements of distances between the first wellbore and, e.g., one or more second wellbores, such distances may be calculated by the wellbore spacing service using the described wellbore segment analysis. Thus, as described in more detail later, one or more distances between the first wellbore and one or more second wellbores may be computed by estimating or calculating each wellbore's horizontal section trajectory as a polyline.

Process 200 may continue at step 208, which includes determining at least two locations on the at least one second wellbore that define a wellbore segment of the second wellbore. For example, in some aspects, the wellbore spacing service may complete step 208 similar to, if not identical to, step 206 but with respect to the at least one second wellbore. For example, if more than one second wellbore is determined in step 204, then step 208 includes determining at least two locations that define a wellbore segment for each of the second wellbores that are determined according to the wellbore search criteria. And as described with respect to step 206, there may be a single or a plurality of wellbore segments determined for each second wellbore.

Process 200 may continue at step 210, which includes determining at least one distance between the wellbore segment of the first wellbore and the wellbore segment of the at least one second wellbore. For example, the wellbore spacing service may determine a maximum distance between the determined wellbore segment on the first wellbore and the determined wellbore segment on the second wellbore. In some aspects, the wellbore spacing service may determine a minimum distance between the determined wellbore segment on the first wellbore and the determined wellbore segment on the second wellbore. In some aspects, the wellbore spacing service may determine a mean distance between the determined wellbore segment on the first wellbore and the determined wellbore segment on the second wellbore. In some aspects, the wellbore spacing service may determine two or more of the maximum, mean, or minimum distance between the wellbore segment on the first wellbore and the wellbore segment on the second wellbore.

In some aspects, each of the described distances (e.g., mean, maximum, minimum) may be determined according to an orthogonal distance from the wellbore segment on the first wellbore and the wellbore segment of the second wellbore. Thus, in some examples, a projection of the distance is perpendicular to the first wellbore (but may not be perpendicular to the second wellbore).

In some aspects, one or more of these described distances (e.g., mean, maximum, and minimum) may each have components that are determined or derived. For example, each measurement may have a horizontal component (e.g., a distance from the wellbore segment of the first wellbore to the wellbore segment of the second wellbore that lies within a horizontal plane between the two wellbores), a vertical component (e.g., a distance from the wellbore segment of the first wellbore to the wellbore segment of the second wellbore that lies within a vertical plane between the two wellbores), and a true component (e.g., a true distance from the wellbore segment of the first wellbore to the wellbore segment of the second wellbore that connects the two wellbores). In some aspects, the true component distance (e.g., mean, maximum, and/or minimum) is determined, and the vertical and horizontal components are derived from the true component.

In example implementations in which one or both of the first and at least one second wellbores have multiple wellbore segments, one or more of the described distances may be determined between each unique wellbore segment and the first wellbore and every wellbore segment of the at least one second wellbore. For example, if there are ten wellbore segments determined (e.g., by a directional survey) on the first wellbore and there are ten wellbore segments determined (e.g., by a directional survey) on one of the second wellbores, then there would be 100 unique pairs of wellbore segments between which one or more of the described distances would be determined.

Figure 5A:
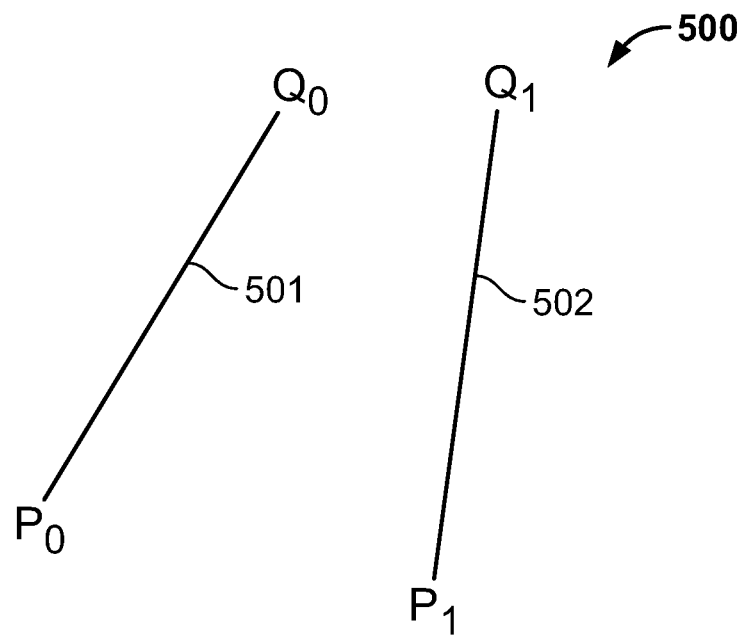
FIGS. 5A-5D are schematic illustrations of adjacent wellbores in which one or more distances therebetween may be determined according to the present disclosure.

In some aspects, the wellbore spacing service may determine wellbore segment-to-wellbore segment distances in an example implementation as graphically described in FIGS. 5A-5D. For example, FIG. 5A shows a wellbore segment 501 of the first wellbore and a wellbore segment 502 of the second wellbore. The points, $Q_0$ and $P_0$, for example, represent two locations (e.g., from a directional survey) on the first wellbore that define the wellbore segment 501. The points $Q_1$ and $P_1$, for example, represent two locations (e.g., from a directional survey) on the second wellbore that define the wellbore segment 502. Parametric expressions can be set to describe the wellbore segments 501 and 502:

$$s_0: P_0 + td_0, 0 \leq t \leq 1, d_0 = (Q_0 - P_0) \quad \text{Eq. 1, and}$$

$$s_1: P_1 + td_1, 0 \leq s \leq 1, d_1 = (Q_1 - P_1) \quad \text{Eq. 2.}$$

Eq. 1 represents the parametric expression of wellbore segment 501. Eq. 2 represents the parametric expression of wellbore segment 502. In these equations, $d_0$ and $d_1$ are direction vectors of the wellbore segments 501 and 502, respectively. Also, t and s are parameters along the wellbore segments 501 and 502, respectively, in the parametric form of the segment equations.

Figure 5B:
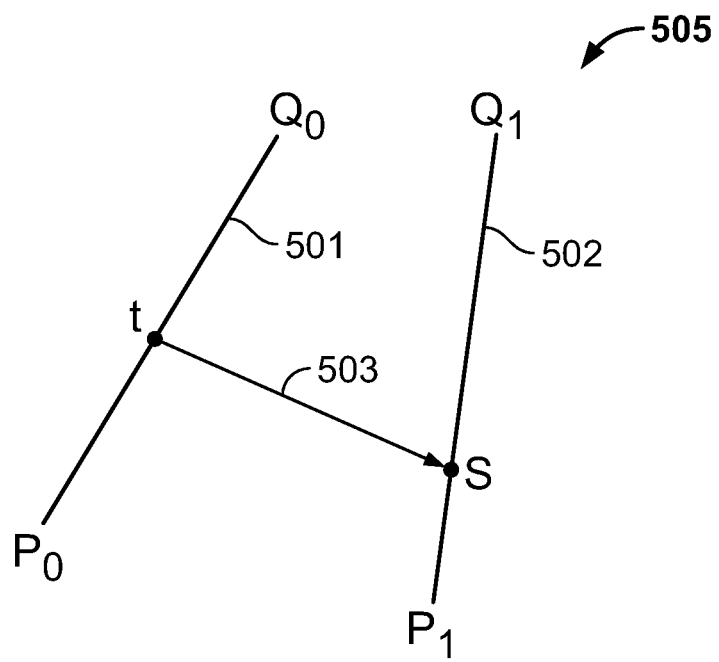

FIG. 5B shows a vector 503 that connects a location at t on the wellbore segment 501 to a location at s on the wellbore segment 502. The magnitude of this vector is the distance between the locations. The vector, v, is represented as:

$$v = (P_1 - P_0) + sd_1 - td_0 \quad \text{Eq. 3.}$$

The magnitude of the vector, v, i.e., the distance, is represented by:

$$\text{Distance} = \|v\| = \sqrt{v \cdot v} \quad \text{Eq. 4.}$$

Furthermore, the squared distance (e.g., as a hyperboloid) between the two locations on the wellbore segments 501 and 502, respectively, is represented as:

$$d(s,t)^2 = v \cdot v = (P_1-P_0)\cdot(P_1-P_0) - 2t(P_1-P_0)\cdot d_0 + 2s(P_1-P_0)\cdot d_1 - 2ts d_0 \cdot d_1 + t^2 d_0 \cdot d_0 + s^2 d_1 \cdot d_1 \quad \text{Eq. 5.}$$

Figure 5C:
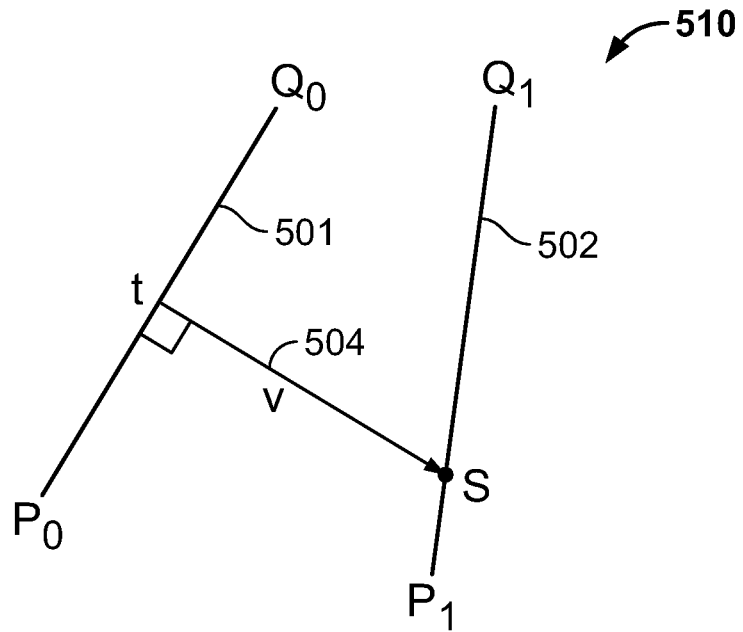

As shown in FIG. 5C, a perpendicular vector 504 ($v$) is shown connected from the wellbore segment 501 (to which the vector is orthogonal) to the wellbore segment 502 (to which the vector may or may not be orthogonal). When the vector, $v$, is orthogonal to the wellbore segment 501:

$$d_0 \cdot v = 0 \quad \text{Eq. 6,}$$

$$(P_1-P_0)\cdot d_0 + s d_0 \cdot d_1 - t d_0 \cdot d_0 = 0 \quad \text{Eq. 7, and}$$

$$s = \frac{t d_0 \cdot d_0 - (P_1 - P_0) \cdot d_0}{d_0 \cdot d_1}. \quad \text{Eq. 8}$$

Figure 5D:
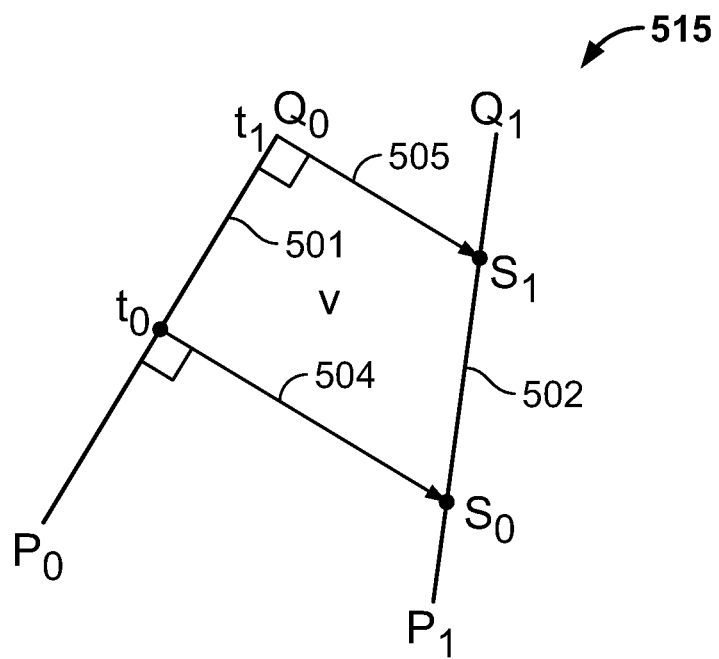

Turning to FIG. 5D, by constraining $0 \leq t \leq 1$ and $0 \leq s \leq 1$, a valid range of t is $t_0 \leq t \leq t_1$. In determining the perpendicular wellbore segment-to-wellbore segment distance, s can be substituted into $d(s,t)^2$ according to the following:

$$s = \frac{t d_0 \cdot d_0 - (P_1 - P_0) \cdot d_0}{d_0 \cdot d_1}. \quad \text{Eq. 9}$$

This provides the perpendicular distance between wellbore segments 501 and 502 as a quadratic function of t:

$$d(t)^2 = At^2 + Bt + C \quad \text{Eq. 10, where}$$

A, B, and C are coefficients and combinations of dot products of $(P_1-P_0)$, $d_0$, and $d_1$. Further, the location on the wellbore segment 502 may be determined by the perpendicular constraint, so the s variable is no longer pertinent.

As previously described, a determined distance between the wellbore segment 501 and the wellbore segment 502 may be a maximum distance, a minimum distance, and/or a mean distance. In the example of the perpendicular distances, these distances may be determined according to the following:

$$d_{min} = \min d(t_0), d(t_1) = d(t), \text{ where } \frac{d}{dt}d(t)^2 = 0, \text{ if } t_0 \leq t \leq t_1, \quad \text{Eq. 10}$$

$$d_{max} = \max d(t_0), d(t_1), \text{ and} \quad \text{Eq. 11}$$

$$d_{avg} = \frac{1}{t_1 - t_0} \int_{t_0}^{t_1} \sqrt{d(t)^2} \, dt. \quad \text{Eq. 12}$$

The coefficients, A, B, and C, may be defined as follows:

$$A = d_{00}\left(\frac{d_{00}d_{11}}{d_{01}^2} - 1\right), \quad \text{Eq. 13}$$

$$B = 2\frac{d_{00}}{d_{01}}\left(\frac{q_0 d_{11}}{d_{01}} - q_1\right), \text{ and} \quad \text{Eq. 14}$$

$$C = p - \frac{2q_0 q_1}{d_{01}} + \frac{q_0^2 d_{11}}{d_{01}^2}. \quad \text{Eq. 15}$$

In Eqs. 13-15, the following variables are used:

$$p = (P_1 - P_0) \cdot (P_1 - P_0) \quad \text{Eq. 16,}$$

$$q_0 = -(P_1 - P_0) \cdot d_0 \quad \text{Eq. 17,}$$

$$q_1 = -(P_1 - P_0) \cdot d_1 \quad \text{Eq. 18,}$$

$$d_{00} = d_0 \cdot d_0 \quad \text{Eq. 19,}$$

$$d_{01} = d_0 \cdot d_1 \quad \text{Eq. 20, and}$$

$$d_{11} = d_1 \cdot d_1 \quad \text{Eq. 21.}$$

Eq. 10 can be substituted into Eq. 12 to yield Eq. 22, which is:

$$d_{avg} = \frac{1}{t_1 - t_0} \frac{(2At+B)\sqrt{At^2+Bt+C}}{4A} - \frac{(B^2-4AC)\log\left(2\sqrt{A}\sqrt{At^2+Bt+C}+2At+B\right)}{8A^{3/2}} + \text{constant.}$$

In some aspects, in determining an average perpendicular distance between wellbore segment 501 and wellbore segment 502, the wellbore spacing service may determine an average perpendicular vector rather than areal and vertical components. Once the average perpendicular vector is determined, then the areal and vertical components may be determined. For example, by substituting the expression for s from Eq. 9 into Eq. 3, then the perpendicular vector, $v_{perp}$, from wellbore segment 501 to wellbore segment 502 is:

$$v_{perp} = (P_1 - P_0) - t d_0 + \frac{t d_0 \cdot d_0 - (P_1 - P_0) \cdot d_0}{d_0 \cdot d_1} d_1. \quad \text{Eq. 22}$$

Thus, the average perpendicular vector can be determined according to:

$$v_{perp,avg} = \frac{1}{t_{max} - t_{min}} \int_{t_{min}}^{t_{max}} v_{perp}(t) dt = \quad \text{Eq. 23}$$

$$\frac{1}{t_{max} - t_{min}} \left((t_{max} - t_{min})\left(P_1 - P_0 - \frac{(P_1-P_0)\cdot d_0}{d_0 \cdot d_1} d_1\right) + \frac{1}{2}(t_{max}^2 - t_{min}^2)\left(\frac{d_0 \cdot d_0}{d_0 \cdot d_1} d_1 - d_0\right)\right) =$$

$$\left(P_1 - P_0 - \frac{(P_1-P_1)\cdot d_0}{d_0 \cdot d_1} d_1\right) + \frac{t_{max}+t_{min}}{2}\left(\frac{d_0 \cdot d_0}{d_0 \cdot d_1} d_1 - d_0\right).$$

Thus, $d_{avg} = \|v_{perp,avg}\|$. Eq. 24

Process 200 may continue at step 212, which includes determining at least one distance between the first wellbore and the at least one second wellbore based on the determined distance between the two wellbore segments. For example, in some aspects, the determined minimum, maximum, and mean distances between wellbore segments, or in the case of multiple wellbore segments on the first and second wellbores, all the pairs of wellbore segments from the first and second wellbores' horizontal portions are combined to derive the minimum, maximum, and mean distances between the first wellbore and the at least one second wellbore. In some aspects, one or all of the minimum, maximum, or mean distances between the first wellbore and the at least one second wellbore may be determined for each of a vertical, horizontal, and true distance between such wellbores.

In an example of step 212, and continuing from Eqs. 1-24, the minimum determined perpendicular distance, $d_{min}$, between the first wellbore on which wellbore segment 501 is located and the second wellbore on which wellbore segment 502 is located is determined according to:

$$\min_{segmentpairs} d_{min}$$

This expression shows that the minimum distance between all possible combinations of one segment of the first wellbore and a segment of the second wellbore have been determined according to Eq. 10. In some aspects, the minimum distance connecting the first wellbore to the second wellbore is the minimum value of those segment-to-segment minimum distances. Likewise, the maximum determined perpendicular distance, $d_{max}$, between the first wellbore on which wellbore segment 501 is located and the second wellbore on which wellbore segment 502 is located is determined according to:

$$\max_{segmentpairs} d_{max}$$

This expression shows that the maximum distance connecting the first wellbore to the second wellbore is the maximum value of the segment-to-segment maximum distances in Eq. 11. The average determined perpendicular distance between the first wellbore on which wellbore segment 501 is located and the second wellbore on which wellbore segment 502 is located is determined according to:

$$\frac{\sum segmentpairs \|d_0\| (t_1 - t_0) d_{avg}}{\sum segmentpairs \|d_0\| (t_1 - t_0)}$$

This expression describes the average bore-to-bore distance as the average of the average segment-to-segment distances in Eq. 24 weighted by the length of portion of each segment on the first wellbore that can be connected to a segment on the second wellbore in Eq. 9.

Process 200 may continue at step 214, which includes generating a graphical representation of the determined at least one distance between the first wellbore and the at least one second wellbore. For example, FIG. 6A illustrates a GUI 600 that shows an output, e.g., suitable to show on a graphical user interface on a client device, of the determined at least one distance between the first wellbore and the at least one second wellbore. For example, as shown, in this example, the "parent wellbore" represents the first wellbore, and there are three second wellbores shown as "child wellbore #1," "child wellbore #2," and "child wellbore #3." For each pairing of the parent wellbore and one of the child wellbores, multiple determined distances are shown, such as minimum, maximum, and mean distance values (in feet) of the vertical distance between the pair of wellbores, the horizontal distance between the pair of wellbores, and the true distance between the pair of wellbores.

In additional example aspects of process 200, the various distance metrics (e.g., mean, maximum, minimum) may be categorized (e.g., by the wellbore spacing service) into two or more types. For example, one or more of the second wellbores may be categorized as "nearest-neighbor" wellbores. As another example, one or more of the second wellbores may be categorized as "time-based" wellbores. In some aspects, "Nearest neighbor" well spacing distances are denoted with 'NN' in an attribute name of the second wellbore and are primarily concerned with the nearest offset wells from the first wellbore. This category may not account for a time at which the second wellbores may come online (e.g., first production date). In some aspects, therefore, process 200 may account for one or more second wellbores that are offset from the first wellbore within a defined search radius and associates the respective distance calculations to the one or more second wellbores. Further, in some aspects, each of the one or more second wellbores may be defined as a "primary" or a "secondary" well. A primary well may be defined as the nearest wellbore to the first wellbore based on mean true (e.g., three-dimensional (3D)) distance, while a secondary well may be defined as the closest well on the opposite side of the first wellbore from the primary well, also based on mean true (3D) distance.

As described, in some aspects, average distances are determined in order to understand a sense of average spacing for a first wellbore. The average spacing, in some aspects, may be an average of the primary and secondary distance measurements.

In some aspects, the "time-based" distance calculations account for when the one or more second wellbores (i.e., offset wells), within a defined search radius, are brought online. For example, in analyzing impacts of well spacing, understanding the evolution of drilling and production with respect to wells being brought online through time, has an impact on the future potential of wells being drilled. As described later, various identifiers or flags that address the "time-based" component of well spacing analysis may be assigned to each of the offset wells.

FIG. 2B illustrates an example sub-process that may be executed by the wellbore spacing service for step 204 of process 200 described in FIG. 2A for determining at least one second wellbore from a plurality of wellbores. For example, the sub-process for step 204 can be performed by or with the wellbore spacing solver 130 of the structured data processing server system 112 in the distributed network architecture 100 shown in FIG. 1B. The sub-process of FIG. 2B may begin at step 250, which includes identifying one or more search criteria. For example, the wellbore search criteria that the wellbore spacing service may select (e.g., based on operator or user input or otherwise) may include, for instance, geographic adjacency of one or more wellbores to the first wellbore, temporal adjacency of one or more wellbores to the first wellbore. In some aspects, both geographic and temporal adjacency may be used as search criteria. In some aspects, other search criteria, such as specific names or attributes (e.g., fields, formations, depths, etc.) of wells offset from the first wellbore may be used in the sub-process of FIG. 2B.

The sub-process of FIG. 2B may continue at step 252, which includes a decision on which of the identified wellbore search criteria to use to determine the at least one second wellbore. For example, in this example sub-process, the wellbore spacing service may select a distance from the first wellbore (e.g., geographical adjacency) or a reference date of the first wellbore (e.g., temporal adjacency). Other example implementations may use both such search criteria, other search criteria, or a combination thereof.

Based on the decision in step 252 that the search criteria includes a distance from the first wellbore, the sub-process continues at step 254, which includes determining a surface trajectory (e.g., the distance) of the first wellbore between an entry point and a surface point above a bottom hole location. For example, the trajectory may be determined between entry point and the surface location that is above the toe location of the wellbore.

Figure 4A:
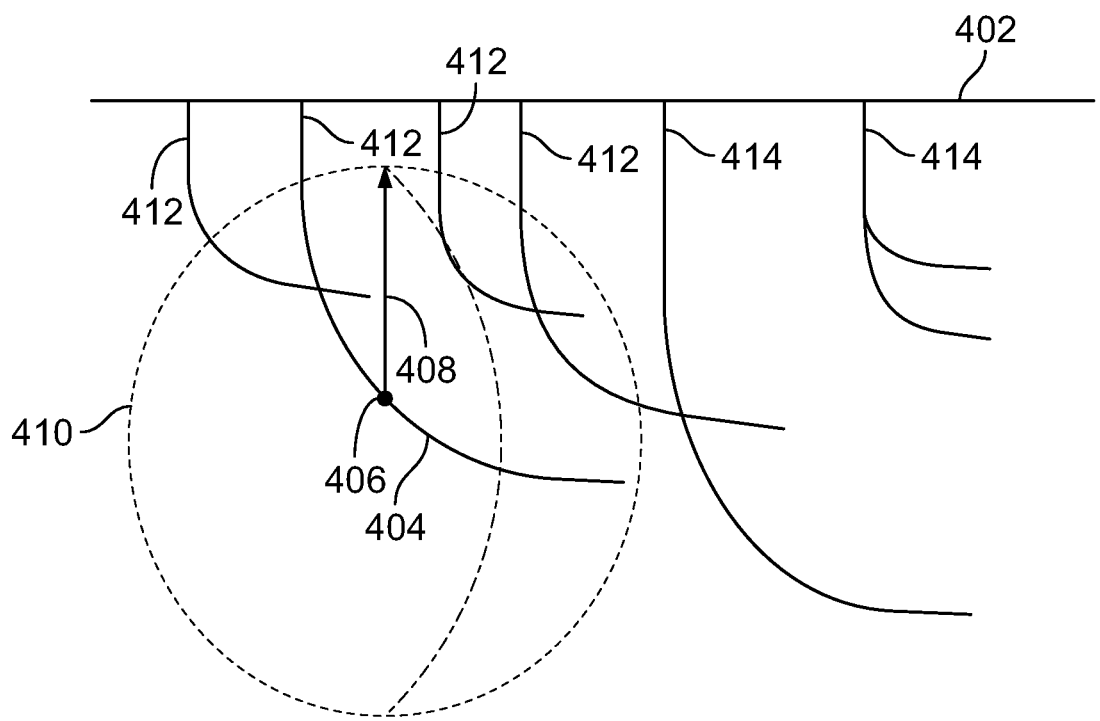
FIGS. 4A-4B are schematic illustrations of volumetric wellbore search criteria according to the present disclosure.

The sub-process of FIG. 2B may continue at step 256, which includes determining wellbore(s) that passes within a volume defined by the distance from the surface trajectory of the first wellbore. For example, FIG. 4A illustrates an example in which the volume defined by the distance from the surface trajectory is a spherical volume 410 in which a radius 408 of the spherical volume 410 is equal or about equal to the surface trajectory of the first wellbore 404 (formed from terranean surface 402). In this example, a center of the spherical volume may be the heel location 406 of the first wellbore 404. In other examples, the center of the spherical volume may be an entry location of the first wellbore, a toe location of the first wellbore, or other location.

Figure 4B:
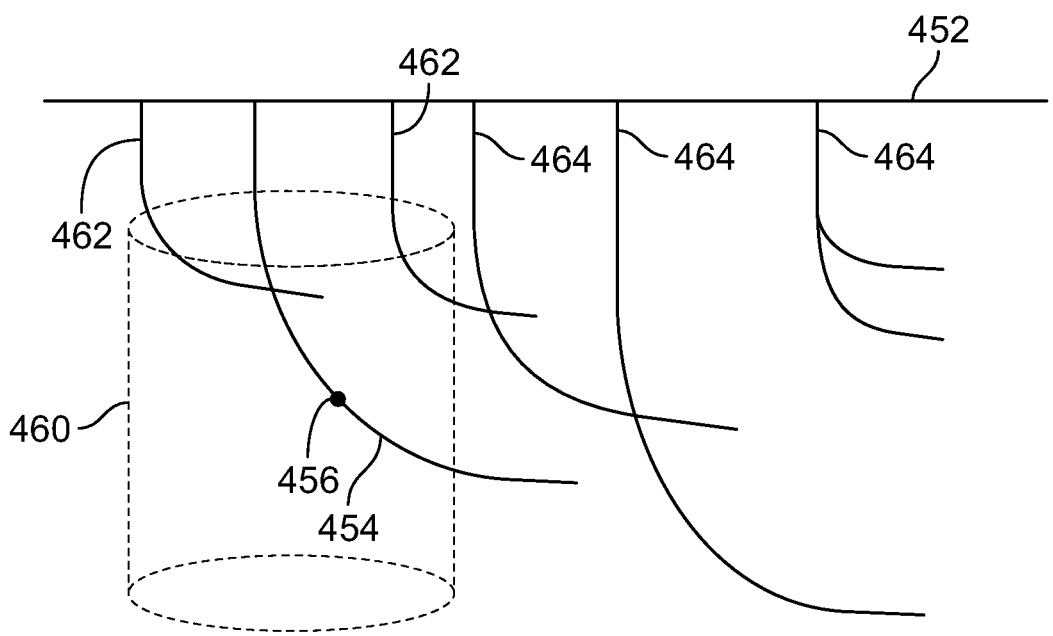

As another example, FIG. 4B illustrates an example in which the volume defined by the distance from the surface trajectory is a cylindrical volume 460 in which a dimension of the cylindrical volume is equal or about equal to the surface trajectory. In this example, a center of the cylindrical volume may be the heel location 456 of the first wellbore 454 (formed from a terranean surface 452). In other examples, the center of the cylindrical volume 460 may be an entry location of the first wellbore, a toe location of the first wellbore, or other location.

In step 256, one or more wellbores (e.g., wellbores 412 and wellbores 462 as shown in FIG. 4A or 4B, respectively), may pass within the volume (e.g., spherical 410, cylindrical 460, or otherwise). Such wellbores, in which a portion may pass through the volume, may automatically be determined as the one or more second wellbores. In such an example, the sub-process of FIG. 2B may end. In other example implementations, the sub-process may continue.

The sub-process of FIG. 2B may continue at step 258, which includes determining wellbore(s) that have a horizontal portion that has at least a defined percentage within the volume. For example, once the one or more wellbores that pass through the volume or determined in step 256, the wellbore spacing service may determine, of those wellbores, which have a particular percentage of their horizontal portion that pass through the volume. For example, the particular percentage may be 15%. Thus, in step 258, the wellbores that pass through the volume as determined in step 256 and also pass through with at least 15% of their horizontal portion are selected as the one or more second wellbores in step 258. Wellbores that do not pass through the spherical volume 410 (such as wellbores 414) or wellbores that do not pass through the cylindrical volume 460 (such as wellbore 464), may not be determined as second wellbores.

Figure 6B:
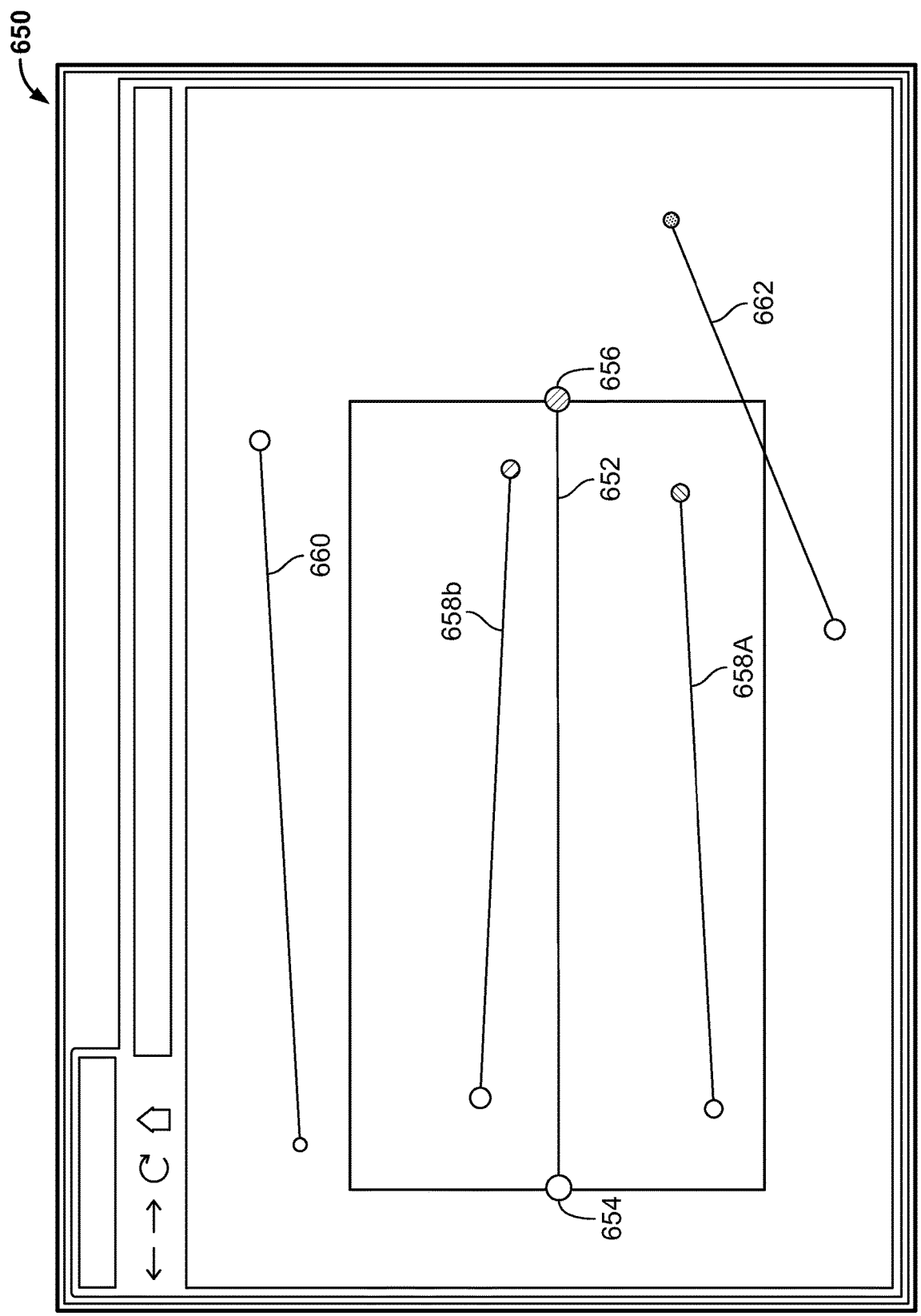

The sub-process of FIG. 2B may continue at step 260, which includes generating a graphical map representation of the first wellbore and the determined at least one second wellbore. For example, as shown in FIG. 6B, a GUI 650 shows a first wellbore 652 (also called a parent wellbore) and several child wellbores. In this example, the parent wellbore 652 is shown as a straight line between a surface entry point 654 and a toe surface projection point 656. In this example, there are four child wellbores shown (658*a-b*, 660, and 662), with the one or more second wellbores 658*a* and 658*b* meeting the criteria described in the sub-process of FIG. 2B. Child wellbore 660 is not considered a second wellbore, because, for instance, its wellbore path is not within a defined trajectory from the first wellbore 652. Child wellbore 662 is not considered a second wellbore, because, for instance, less than a specified percentage (e.g., 85%) of its wellbore path is not within the defined trajectory from the first wellbore 652.

Returning to FIG. 2B, based on the decision in step 252 that the search criteria includes a reference date of the first wellbore, the sub-process continues at step 262, which includes determining a surface trajectory of the first wellbore between an entry point and a surface point above a bottom hole location. For example, as shown in FIG. 4A, the trajectory may be determined between entry point and the surface location that is above the toe location of the wellbore. Likewise, as shown in FIG. 4B, the trajectory may be determined between entry point and the surface location that is above the toe location of the wellbore.

The sub-process of FIG. 2B may continue at step 264, which includes determining wellbore(s) within the search volume that have an online date within a time range that includes the reference date. For example, in some aspects, the reference date of the first wellbore may be a completion date. Thus, if the online date of one or more well within the trajectory is within a range (e.g., plus or minus thirty days or other range) of the completion date of the first wellbore, then the one or more wells may be determined to be the one or more second wellbores. In another example, the reference date of the first wellbore may be a first production date. Thus, if the online date of one or more well within the search volume is within a range (e.g., plus or minus thirty days or other range) of the first production date of the first wellbore, then the one or more wells may be determined to be the one or more second wellbores. As yet another example, the reference date of the first wellbore may be a last production date. Thus, if the online date of one or more well within the search volume is within a range (e.g., plus or minus thirty days or other range) of the last production date of the first wellbore, then the one or more wells may be determined to be the one or more second wellbores.

Figure 6C:
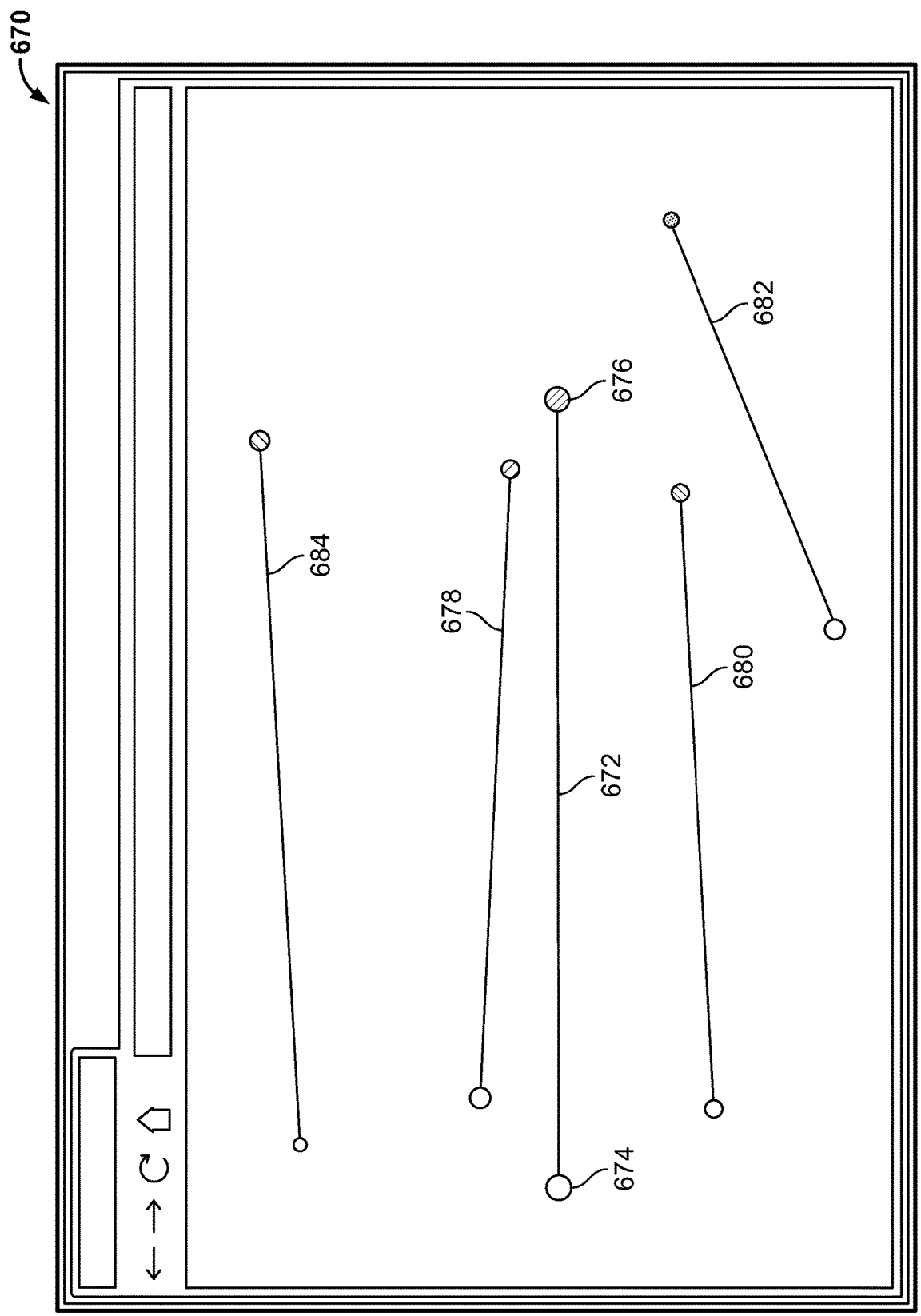

The sub-process of FIG. 2B may continue at step 260, which includes generating a graphical map representation of the first wellbore and the determined at least one second wellbore, as shown in FIG. 6C. For example, the GUI 670 shows a first wellbore 672 (also called a parent wellbore) and several child wellbores. In this example, the parent wellbore 672 is shown as a straight line between a surface entry point 674 and a toe surface projection point 676. In this example, there are four child wellbores shown (678, 680, 682, and 684), with the one or more second wellbores 678 and 682 meeting the reference time criteria described in the sub-process of FIG. 2B. Child wellbores 680 and 684, for example, are not considered second wellbore, because, for instance, their reference date is not sufficiently proximate to the reference date of the first wellbore 672.

Thus, in some aspects, the sub-process of FIG. 2B may calculate distance values for offset wells within a defined horizontal search radius around the first wellbore, thus limiting the wells for the well spacing analysis. In some aspects, the search radius is an estimate beyond which well interaction may not be expected to occur, recognizing that this estimated radius varies geographically. In some aspects, a search radius may be provided by a user or preset in the wellbore spacing service as a horizontal distance from the first wellbore entry location. In some aspects, the search is based off the first wellbore stick that is built using a surface hole location (SHL) and a bottom hole location (BHL) of the first wellbore. The actual spacing distance calculations, however, may be calculated based on the trajectory itself, and not the surface-to-bottom hole well stick. To avoid outliers and address any erroneous calculations, additional conditions may be added in considering wells in the defined search radius. For horizontal wells that intersect the defined search radius, the wellbore spacing service may consider wells that have at least a certain percentage (e.g., 15%) of their horizontal section length within the search radius and, in some aspects, additionally that length must be at least 15% of the first wellbore's horizontal section length. In some aspects, this may remove consideration of any outlier wells that occur because of skewed wellbore trajectory paths, cross-cutting trajectories, and other spacing scenarios that create erroneous data points impairing data quality.

A vertical component of the search radius may also be utilized in the sub-process of FIG. 2B. In some aspects, the vertical component may be broken out into two categories, including: (1) all landing zones; and (2) same landing zone. The "all landing zones" category may mean that the wellbore spacing service considers wells as second wellbores if such wells are within the same landing zone as the first wellbore or within a predetermined vertical distance (e.g., 500 feet) of the landing zone of the first wellbore. The "same landing zone" category may mean that the wellbore spacing service considers wells as second wellbores only if such wells are within the same landing zone as the first wellbore. In some aspects, both categories assume that the same horizontal component of the search radius is used as previously described.

Figure 7:
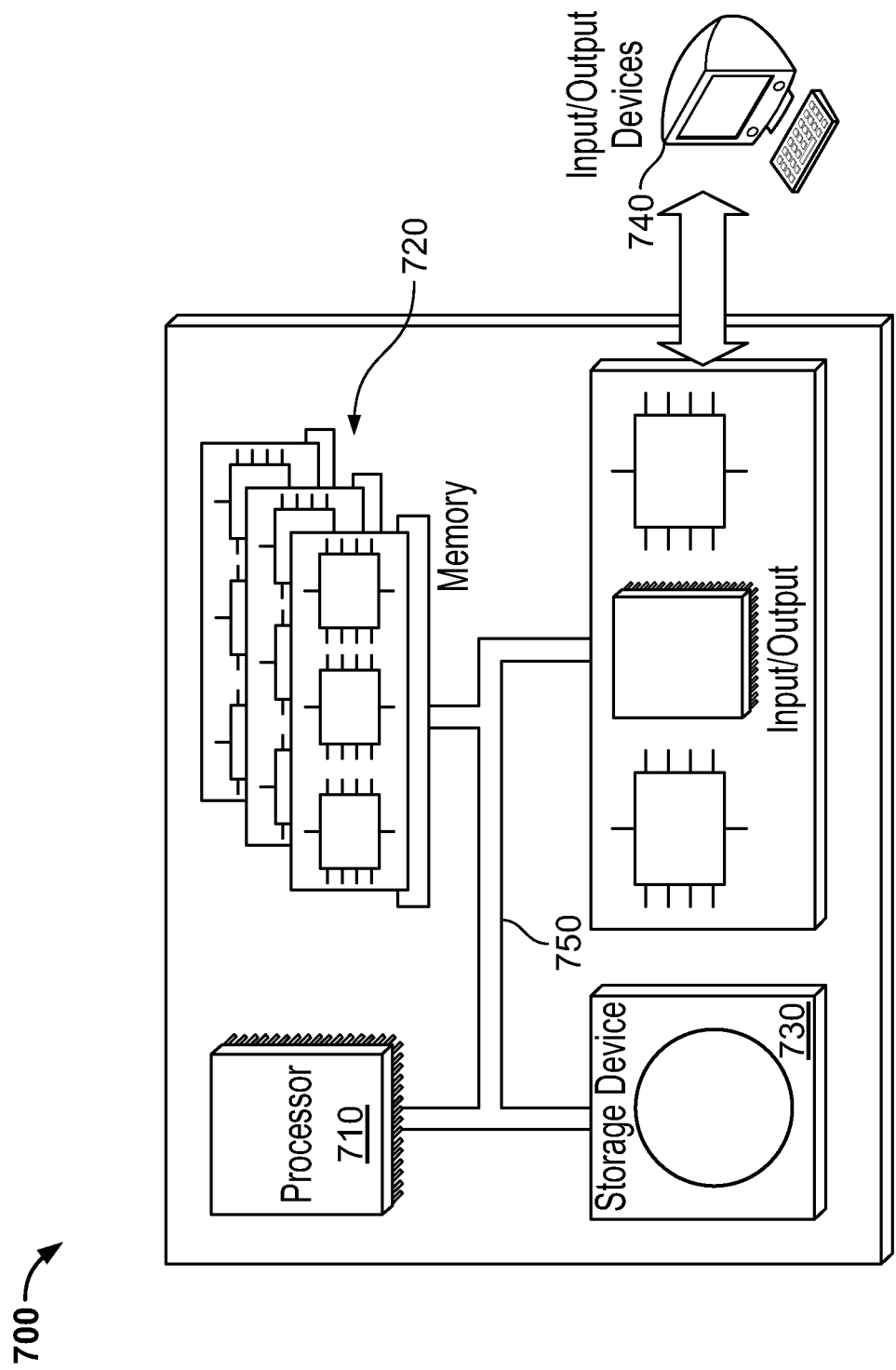
FIG. 7 is a schematic diagram of a structured data processing system that can be used for the operations described in association with any of the computer-implemented processes described herein.

FIG. 7 is a schematic diagram of a computer system 700. The system 700 can be used for the operations described in association with any of the computer-implemented methods described previously, for example as or as part of the structured data processing server system 112 or other data processing systems described herein.

The system 700 is intended to include various forms of digital computers, such as laptops, desktops, workstations, personal digital assistants, servers, blade servers, mainframes, and other appropriate computers. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications may be made without departing from the spirit and scope of what is described. For example, the steps of the exemplary flow charts in FIGS. 2A-2B may be performed in other orders, some steps may be removed, and other steps may be added. Accordingly, other embodiments are within the scope of the following claims.

What is claimed is:

1. A computer-implemented method for determining wellbore spacing, comprising:
   (1) identifying, with one or more hardware processors, a first wellbore formed from a terranean surface into a subterranean formation of a plurality of wellbores formed from the terranean surface toward the subterranean formation from a first digital wellbore data file stored in a non-transitory computer-readable media that is associated with the first wellbore;
   (2) determining, with the one or more hardware processors, at least one second wellbore formed from the terranean surface toward the subterranean formation of the plurality of wellbores based on one or more wellbore search criteria from at least one second digital wellbore file stored on the non-transitory computer-readable media that is associated with the at least one second wellbore, the one or more wellbore search criteria comprising a distance from the first wellbore and a reference date of the first wellbore, and determining the at least one second wellbore formed from the terranean surface toward the subterranean formation of the plurality of wellbores based on one or more wellbore search criteria comprises:
       (a) determining, with the one or more hardware processors, a surface trajectory of the first wellbore between a first surface location that corresponds to an entry point of the first wellbore and a second surface location that corresponds to a surface point above a bottom hole location of the first wellbore;
       (b) determining, with the one or more hardware processors, the at least one second wellbore of the plurality of wellbores that passes within a volume defined by the distance from the surface trajectory of the first wellbore and generating, based on the determination, a first graphical view comprising the surface trajectory of the first wellbore between the first surface location and the second surface location and the determined second wellbore that passes within the volume; and
       (c) determining, with the one or more hardware processors, the at least one second wellbore of the plurality of wellbores that comprises an online date within at least one of a first time duration prior to the reference date of the first wellbore or a second time duration subsequent to the reference date of the first wellbore, and generating, based on the determination, a second graphical view comprising the first wellbore and the determined second wellbore that comprises the online date;
   (3) determining, with the one or more hardware processors, at least two locations on the first wellbore that define a wellbore segment of the first wellbore;
   (4) determining, with the one or more hardware processors, at least two locations on the at least one second wellbore that define a wellbore segment of the at least one second wellbore;
   (5) determining, with the one or more hardware processors, at least one distance between the wellbore segment of the first wellbore and the wellbore segment of the at least one second wellbore;
   (6) determining, with the one or more hardware processors, at least one distance between the first wellbore and the at least one second wellbore based on the determined at least one distance between the wellbore segment of the first wellbore and the wellbore segment of the at least one second wellbore; and
   (7) generating, with the one or more hardware processors, a graphical representation of the determined at least one distance between the first wellbore and the at least one second wellbore to display on a graphical user interface (GUI), the graphical representation comprising the first graphical view comprising the surface trajectory of the first wellbore between the first surface location and the second surface location and the determined second wellbore that passes within the volume, the GUI transitioning, subsequent to step (2b), from the first graphical view to the second graphical view comprising the first wellbore and the determined second wellbore that comprises the online date for showing on the GUI.

2. The computer-implemented method of claim 1, wherein the at least one distance between the first wellbore and the at least one second wellbore comprises at least one of:
   a minimum distance between the first wellbore and the at least one second wellbore;
   a maximum distance between the first wellbore and the at least one second wellbore; or
   a mean distance between the first wellbore and the at least one second wellbore.

3. The computer-implemented method of claim 1, wherein the at least two locations on the first wellbore comprise a plurality of locations on a horizontal portion of the first wellbore defined between a toe of the first wellbore and a heel of the first wellbore, and the at least two locations on the at least one second wellbore comprise a plurality of locations on a horizontal portion of the at least one second wellbore defined between a toe of the at least one second wellbore and a heel of the at least one second wellbore, the method further comprising:

determining, with the one or more hardware processors, a plurality of wellbore segments of the first wellbore, each of the plurality of wellbore segments defined between a pair of adjacent locations of the plurality of locations on the horizontal portion of the first wellbore;

determining, with the one or more hardware processors, a plurality of wellbore segments of the at least one second wellbore, each of the plurality of wellbore segments defined between a pair of adjacent locations of the plurality of locations on the horizontal portion of the at least one second wellbore; and determining, with the one or more hardware processors, at least one distance between each of the plurality of wellbore segments of the first wellbore and the plurality of wellbore segments of the at least one second wellbore.

4. The computer-implemented method of claim 3, further comprising:

determining, with the one or more hardware processors, the at least one distance between the first wellbore and the at least one second wellbore based on the determined at least one distance between each of the plurality of wellbore segments of the first wellbore and the plurality of wellbore segments of the at least one second wellbore.

5. The computer-implemented method of claim 4, wherein determining the at least one distance between each of the plurality of wellbore segments of the first wellbore and the plurality of wellbore segments of the at least one second wellbore comprises:

determining a minimum distance between each of the plurality of wellbore segments of the first wellbore and the plurality of wellbore segments of the at least one second wellbore;

determining a maximum distance between each of the plurality of wellbore segments of the first wellbore and the plurality of wellbore segments of the at least one second wellbore; and determining a mean distance between each of the plurality of wellbore segments of the first wellbore and the plurality of wellbore segments of the at least one second wellbore.

6. The computer-implemented method of claim 3, further comprising determining the plurality of locations on the horizontal portion of the first wellbore based at least in part on a directional survey of the first wellbore.

7. The computer-implemented method of claim 1, wherein determining the at least two locations on the first wellbore that define the wellbore segment of the first wellbore comprises:

determining, with the one or more hardware processors, a first location that corresponds to a heel of the first wellbore;

determining, with the one or more hardware processors, a second location that corresponds to a toe of the first wellbore; and determining, with the one or more hardware processors, the wellbore segment of the first wellbore that comprises a direct line between the first and second locations.

8. The computer-implemented method of claim 1, wherein the at least one distance between the wellbore segment of the first wellbore and the wellbore segment of the at least one second wellbore comprises at least one orthogonal distance between the wellbore segment of the first wellbore and the wellbore segment of the at least one second wellbore.

9. The computer-implemented method of claim 1, further comprising determining, with the one or more hardware processors, the at least one second wellbore of the plurality of wellbores that comprises a horizontal portion that has at least a defined percentage within the volume defined by the distance from the surface trajectory of the first wellbore.

10. The computer-implemented method of claim 1, further comprising:

generating, with the one or more hardware processors, a graphical map representation of the first wellbore and the determined at least one second wellbore.

11. The computer-implemented method of claim 1, wherein the reference date of the first wellbore comprises at least one of a completion date of the first wellbore, a first production date of the first wellbore, or a last production date of the first wellbore.

12. The computer-implemented method of claim 1, further comprising:

determining, with the one or more hardware processors, that a particular one of the plurality of wellbores passes wholly outside of the volume defined by the distance from the surface trajectory of the first wellbore; or determining, with the one or more hardware processors, that the particular one of the plurality of wellbores comprises an online date outside of the first time duration prior to the reference date of the first wellbore and outside of the second time duration subsequent to the reference date of the first wellbore.

13. The computer-implemented method of claim 12, further comprising setting, with the one or more hardware processors, a flag on the particular one of the plurality of wellbores.

14. The computer-implemented method of claim 1, wherein determining the at least one distance between the first wellbore and the at least one second wellbore based on the determined at least one distance between the wellbore segment of the first wellbore and the wellbore segment of the at least one second wellbore comprises:

determining, with the one or more hardware processors, at least one vertical distance between the first wellbore and the at least one second wellbore;

determining, with the one or more hardware processors, at least one horizontal distance between the first wellbore and the at least one second wellbore; and determining, with the one or more hardware processors, at least one true distance between the first wellbore and the at least one second wellbore.

15. The computer-implemented method of claim 2, wherein the at least two locations on the first wellbore comprise a plurality of locations on a horizontal portion of the first wellbore defined between a toe of the first wellbore and a heel of the first wellbore, and the at least two locations on the at least one second wellbore comprise a plurality of locations on a horizontal portion of the at least one second wellbore defined between a toe of the at least one second wellbore and a heel of the at least one second wellbore, the method further comprising:

determining, with the one or more hardware processors, a plurality of wellbore segments of the first wellbore, each of the plurality of wellbore segments defined between a pair of adjacent locations of the plurality of locations on the horizontal portion of the first wellbore;

determining, with the one or more hardware processors, a plurality of wellbore segments of the at least one second wellbore, each of the plurality of wellbore segments defined between a pair of adjacent locations of the plurality of locations on the horizontal portion of the at least one second wellbore; and determining, with the one or more hardware processors, at least one distance between each of the plurality of wellbore segments of the first wellbore and the plurality of wellbore segments of the at least one second wellbore.

16. The computer-implemented method of claim 15, further comprising:

determining, with the one or more hardware processors, the at least one distance between the first wellbore and the at least one second wellbore based on the determined at least one distance between each of the plurality of wellbore segments of the first wellbore and the plurality of wellbore segments of the at least one second wellbore.

17. A computing system for determining wellbore spacing, the system comprising:

one or more hardware processors;

at least one memory in communication with the one or more hardware processors, the memory storing instructions operable when executed by the one or more hardware processors to cause the one or more hardware processors to perform operations comprising:

(1) identifying a first wellbore formed from a terranean surface into a subterranean formation of a plurality of wellbores formed from the terranean surface toward the subterranean formation from a first digital wellbore data file stored in the at least one memory that is associated with the first wellbore;

(2) determining at least one second wellbore formed from the terranean surface toward the subterranean formation of the plurality of wellbores based on one or more wellbore search criteria and from at least one second digital wellbore data file stored in the at least one memory that is associated with the at least one second wellbore, the one or more wellbore search criteria comprising a distance from the first wellbore and a reference date of the first wellbore, and determining the at least one second wellbore formed from the terranean surface toward the subterranean formation of the plurality of wellbores based on one or more wellbore search criteria comprises:

(a) determining a surface trajectory of the first wellbore between a first surface location that corresponds to an entry point of the first wellbore and a second surface location that corresponds to a surface point above a bottom hole location of the first wellbore;

(b) determining the at least one second wellbore of the plurality of wellbores that passes within a volume defined by the distance from the surface trajectory of the first wellbore and generating, based on the determination, a first graphical view comprising the surface trajectory of the first wellbore between the first surface location and the second surface location and the determined second wellbore that passes within the volume; and (c) determining the at least one second wellbore of the plurality of wellbores that comprises an online date within at least one of a first time duration prior to the reference date of the first wellbore or a second time duration subsequent to the reference date of the first wellbore and generating, based on the determination, a second graphical view comprising the first wellbore and the determined second wellbore that comprises the online date;

(3) determining at least two locations on the first wellbore that define a wellbore segment of the first wellbore;

(4) determining at least two locations on the at least one second wellbore that define a wellbore segment of the at least one second wellbore;

(5) determining at least one distance between the wellbore segment of the first wellbore and the wellbore segment of the at least one second wellbore;

(6) determining at least one distance between the first wellbore and the at least one second wellbore based on the determined at least one distance between the wellbore segment of the first wellbore and the wellbore segment of the at least one second wellbore; and (7) generating a graphical representation of the determined at least one distance between the first wellbore and the at least one second wellbore to display on a graphical user interface, the graphical representation comprising the first graphical view comprising the surface trajectory of the first wellbore between the first surface location and the second surface location and the determined second wellbore that passes within the volume, the graphical user interface transitioning from the first graphical view, subsequent to step (2b) to the second graphical view comprising the first wellbore and the determined second wellbore that comprises the online date for showing on the graphical user interface.

18. The computing system of claim 17, wherein the at least one distance between the first wellbore and the at least one second wellbore comprises at least one of:

a minimum distance between the first wellbore and the at least one second wellbore;

a maximum distance between the first wellbore and the at least one second wellbore; or a mean distance between the first wellbore and the at least one second wellbore.

19. The computing system of claim 17, wherein the at least two locations on the first wellbore comprise a plurality of locations on a horizontal portion of the first wellbore defined between a toe of the first wellbore and a heel of the first wellbore, and the at least two locations on the at least one second wellbore comprise a plurality of locations on a horizontal portion of the at least one second wellbore defined between a toe of the at least one second wellbore and a heel of the at least one second wellbore, and the operations further comprise:

determining a plurality of wellbore segments of the first wellbore, each of the plurality of wellbore segments defined between a pair of adjacent locations of the plurality of locations on the horizontal portion of the first wellbore;

determining a plurality of wellbore segments of the at least one second wellbore, each of the plurality of wellbore segments defined between a pair of adjacent locations of the plurality of locations on the horizontal portion of the at least one second wellbore; and determining at least one distance between each of the plurality of wellbore segments of the first wellbore and the plurality of wellbore segments of the at least one second wellbore.

20. The computing system of claim 19, wherein the operations further comprise:

determining the at least one distance between the first wellbore and the at least one second wellbore based on the determined at least one distance between each of the plurality of wellbore segments of the first wellbore and the plurality of wellbore segments of the at least one second wellbore.

21. The computing system of claim 20, wherein the operation of determining the at least one distance between each of the plurality of wellbore segments of the first wellbore and the plurality of wellbore segments of the at least one second wellbore comprises:
   determining a minimum distance between each of the plurality of wellbore segments of the first wellbore and the plurality of wellbore segments of the at least one second wellbore;
   determining a maximum distance between each of the plurality of wellbore segments of the first wellbore and the plurality of wellbore segments of the at least one second wellbore; and
   determining a mean distance between each of the plurality of wellbore segments of the first wellbore and the plurality of wellbore segments of the at least one second wellbore.

22. The computing system of claim 19, wherein the operations further comprise determining the plurality of locations on the horizontal portion of the first wellbore based at least in part on a directional survey of the first wellbore.

23. The computing system of claim 17, wherein the operation of determining the at least two locations on the first wellbore that define the wellbore segment of the first wellbore comprises:
   determining a first location that corresponds to a heel of the first wellbore;
   determining a second location that corresponds to a toe of the first wellbore; and
   determining the wellbore segment of the first wellbore that comprises a direct line between the first and second locations.

24. The computing system of claim 17, wherein the at least one distance between the wellbore segment of the first wellbore and the wellbore segment of the at least one second wellbore comprises at least one orthogonal distance between the wellbore segment of the first wellbore and the wellbore segment of the at least one second wellbore.

25. The computing system of claim 17, wherein the operations further comprise determining the at least one second wellbore of the plurality of wellbores that comprises a horizontal portion that has at least a defined percentage within the volume defined by the distance from the surface trajectory of the first wellbore.

26. The computing system of claim 17, wherein the operations further comprise:
   generating a graphical map representation of the first wellbore and the determined at least one second wellbore.

27. The computing system of claim 17, wherein the reference date of the first wellbore comprises at least one of a completion date of the first wellbore, a first production date of the first wellbore, or a last production date of the first wellbore.

28. The computing system of claim 17, wherein the operations further comprise:
   determining that a particular one of the plurality of wellbores passes wholly outside of the volume defined by the distance from the surface trajectory of the first wellbore; or
   determining that the particular one of the plurality of wellbores comprises an online date outside of the first time duration prior to the reference date of the first wellbore and outside of the second time duration subsequent to the reference date of the first wellbore.

29. The computing system of claim 28, wherein the operations further comprise setting a flag on the particular one of the plurality of wellbores.

30. The computing system of claim 17, wherein the operation of determining the at least one distance between the first wellbore and the at least one second wellbore based on the determined at least one distance between the wellbore segment of the first wellbore and the wellbore segment of the at least one second wellbore comprises:
   determining at least one vertical distance between the first wellbore and the at least one second wellbore;
   determining at least one horizontal distance between the first wellbore and the at least one second wellbore; and
   determining at least one true distance between the first wellbore and the at least one second wellbore.

31. The computing system of claim 18, wherein the operation of determining the at least two locations on the first wellbore that define the wellbore segment of the first wellbore comprises:
   determining a first location that corresponds to a heel of the first wellbore;
   determining a second location that corresponds to a toe of the first wellbore; and
   determining the wellbore segment of the first wellbore that comprises a direct line between the first and second locations.

32. The computing system of claim 18, wherein the at least one distance between the wellbore segment of the first wellbore and the wellbore segment of the at least one second wellbore comprises at least one orthogonal distance between the wellbore segment of the first wellbore and the wellbore segment of the at least one second wellbore.

* * * * *